(12) United States Patent
Lawrence et al.

(10) Patent No.: US 6,999,959 B1
(45) Date of Patent: Feb. 14, 2006

(54) META SEARCH ENGINE

(75) Inventors: Stephen R. Lawrence, New York, NY (US); C. Lee Giles, Lawrenceville, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 781 days.

(21) Appl. No.: 09/113,751

(22) Filed: Jul. 10, 1998

Related U.S. Application Data

(60) Provisional application No. 60/062,958, filed on Oct. 10, 1997.

(51) Int. Cl.
G06F 17/30 (2006.01)

(52) U.S. Cl. ............... 707/5; 707/3; 707/4; 707/10

(58) Field of Classification Search ............ 707/3, 707/5, 2, 4, 6, 7, 10; 345/866, 968; 709/218, 709/224, 227, 245
See application file for complete search history.

(56) References Cited

U.S. PATENT DOCUMENTS

| 5,913,215 A | * | 6/1999 | Rubinstein et al. ............ 707/10 |
| 5,987,446 A | * | 11/1999 | Corey et al. ................ 707/3 |
| 6,044,385 A | * | 3/2000 | Gross et al. ................ 707/526 |
| 6,078,914 A | * | 6/2000 | Redfern ..................... 707/3 |
| 6,092,074 A | * | 7/2000 | Rodkin et al. .............. 707/102 |
| 6,094,649 A | * | 7/2000 | Bowen et al. ................ 707/3 |
| 6,101,491 A | * | 8/2000 | Woods ....................... 707/3 |
| 6,151,624 A | * | 11/2000 | Teare et al. ................ 707/5 |

OTHER PUBLICATIONS

U.S. Department of Commerce U.S. Patent and Trademark Office, Text Search and Retrieval Examiner Training Manual for the Automated Patent System (APS), Apr. 1996-Feb. 1997, pp. 5-2, 8-6, and 8-9.*

"Finally, a search site for the 20th century!", Highway 61, pp. 1-2.

"Highway 61 Features & Options", Highway 61, pp. 1-2.

"Welcome to The Virtual Mirror!", The Virtual Mirror, pp. 1-3.

"New Features: All and Any buttons for more search options! Boolean query support for all search engines", ProFusion, p. 1.

"How does InferenceFine work?", inferenceFind, the intelligent and fast parallel web search, pp. 1-2.

"MAMMA FAQ", Mamma, The Mother of All Search Engines, pp. 1-2.

"Take surveys for us!", chubba, p. 1.

"WebCompass", PC Magazine Online Utility Guide, pp. 1-2.

"WebSeeker", PC Magazine Online Utility Guide, pp. 1-2.

"Internet FastFind", PC Magazine Online Utility Guide, pp. 1-2.

"Frequently Asked Questions", Savvy Search, pp. 1-3.

"The MetaCrawler FAQ", metcrawler, pp. 1-3.

"Metacrawlwers and Metasearch Engines", Search Engine Watch, pp. 1-3.

(Continued)

*Primary Examiner*—Vincent Millin
*Assistant Examiner*—Ella Colbert

(57) ABSTRACT

A computer implemented meta search engine and search method. In accordance with this method, a query is forwarded to one or more third party search engines, and the responses from the third party search engine or engines are parsed in order to extract information regarding the documents matching the query. The full text of the documents matching the query are downloaded, and the query terms in the documents are located. The text surrounding the query terms are extracted, and that text is displayed.

4 Claims, 34 Drawing Sheets

OTHER PUBLICATIONS

Kihara, E. et al., Multi-agent-based information search systems, Research report from the Information Processing Society, Japan, Incorporated body Information Processing Society, May 17, 1996, vol. 96, Edition 40 (96-DPS-76, pp. 25-30, abstract only.

* cited by examiner

FIG. 2

| Home Options Help Suggestions Problems NECI meta search (13418 queries) |

| Options: |

Individual page timeout: [30 ▼]
Filter pages to highlight hits when viewing full page: [Yes ▼]
Filter images from the pages when viewed: [Keep ▼]
Display pages for each query in the same or a new window: [Same ▼]
Image classification: [Yes ▼]
Add URL to track: [                    ]

22 ⟶  [Update Options]

| Queries being tracked: |

"search engine"  Press [Stop tracking query]  ⟵ 24
signafy   Press [Stop tracking query]

| URLs being tracked: |

Page http://cesdis.gsfc.nasa.gov/linux/drivers/vortex.html [Stop tracking URL]
Page http://www.linuxhq.com/kpatch21.html [Stop tracking URL]
Page ftp://ftp.cygnus.com/pub/egcs/releases/ [Stop tracking URL]  ⟵ 26
Page http://www.neci.nj.nec.com/homepages/giles/ [Stop tracking URL]
Page ftp://ftp.kernel.org/pub/linux/kernel/v2.1/ [Stop tracking URL]

| Description of the options on the main page: |

Hits:     Maximum number of hits to display excluding duplicates
Context:  Number of context characters to show either side of the query terms
Cluster:  Cluster documents after retrieval
Tracking: Start tracking this query and tell me when new documents appear which match the query
Locality: Only show documents in this domain
Age limit: Filter out documents older than the specified age
Depth:    Only show documents with a given subdirectory depth
Images:   Filter images and only show photos or graphics

FIG. 3

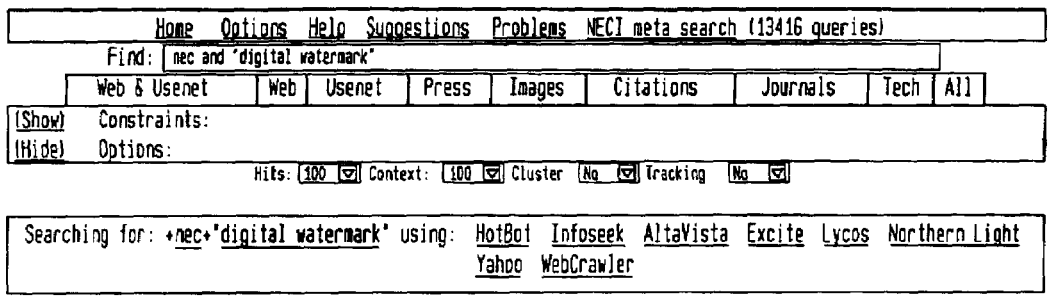

■ Ingemar Cox Home Page I 1m 13k http://www.neci.nj.nec.com/homepages/ingemar/ingemar.html
...http://www.neci.nj.nec.com/homepages/ingemar/ingemar.html.../...ar Cox Home Page Ingemar J. Cox Sr. Research Scientist, Computer Vision, NEC Research Institute My most recent work has focused on the development of statistical framewor.../...r investigation include face recognition, and stereo correspondence problems. Address NEC Research Institute 4 Independence Way Princeton, NJ 08540, USA Office: 609-951-2722 Fax.../...My most recent work has focused on the development of statistical frameworks for motion analysis, digital watermarking and content-based image database retrieval. Other projects currently under investigation includ...
— 32

■ NECI Technical Report 95-10 I 1y 2k http://www.neci.nj.nec.com/tr/neci-abstract-95-10.html
...NECI Technical Report 95-10... ...http://www.neci.nj.nec.com/tr/neci-abstract-95-10.html.../...NECI Technical Report 95-10 NECI Technical Report 95-10 NEC Research Institute, 4 Indepe.../...Ingemar J. Cox, Joe Kilian, Tom Leighton, and Talal Shamoon. December 4, 1995. We describe a digital watermarking method for use in audio, image, video and multimedia data. We argue that a watermark must be p.../...n, including dithering and recompression and rotation, translation, cropping and scaling. The same digital watermarking algorithm can be applied to all three media under consideration with only minor modifications. ...
— 32

■ Mass High Tech I n/a 4k http://boston.com/mht/issue/w81296/index.html
...sites Netscape Bonds With Apple, Netscan Netscape Bonds With Apple JEM and NEC to its online factory outlet Local science teachers Access Excellence A digitized play.../...Lead Stories August 12-17, 1996 This Week In Mass High Tech ARIS says it's on key with digital watermark is right on tune Info highway rest stops CAT's meow of Web sites Netscape Bond...

☐ BU CAS SC 585: Image and Video Computing -- Syllabus I n/a 6k
http://www.cs.bu.edu/faculty/sclaroff/courses/cs585/syllabus.html
...Cox, J. Killian, T. Leighton, and T. Shamoon. Secure Spread Spectrum Watermarking for Multimedia. NEC Research Institute Technical Report 95-10. M. Kass, A. Witkin, and D. Terzopoulos, Snakes: Acti.../...ions [1,2] Oct T 1 Edge detection C5 P1 due, P2 out A 3 Digital watermark, steganography [3] T 8 Edges, contours C6 A 10 Curve matchin...

■ SMH COMPUTERS February 20 1996: Mark to foil Net pirates H n/a 2k
http://www.smh.com.au/computers/content/960220/news6-960220.html
...6 : Mark to foil Net pirates Week of February 20, 1996 Mark to foil Net pirates NEC researchers in the US have developed a 'digital watermark' that can be attached to a multimedia info.../...ing its owner beyond doubt in the case of a copyright dispute. Embedded in the data itself. NEC says it is "a mathematically derived code included in the frequency signals of the information sen.../...re multimedia information of dubious ownership is proliferating. The code is invisible to users and NEC is confident it cannot be found and stripped out by multimedia pirates. It is embedded in .../.. February 20, 1996 Mark to foil Net pirates NEC researchers in the US have developed a 'digital watermark' that can be attached to multimedia information, identifying its owner beyond doubt in the case of...

[...section deleted...]

FIG. 4

Ranked pages (first 20):

R1: 299.974 ■ NEWSbytes A ly 36k http://nccr.monitor.ca/montior/issues/vol3iss7/newsbytes.htm)
...torola licenses Apple OS Apple CEO reveals new strategy Chess: Kasparov beats Deep Blue NEC 'Digital Watermark' technology Week of February 12 - February 16 / 1996 New Fax stand.../...-around won't come cheap ENIAC to run on 50th anniversary Mitel demos USB phone-computer connection Previous Page / Next Page Week of March 4 - March 8/.../...ely, and productively. The products offered by the Small Business Unit will reportedly let users connect to the Internet as well as create corporate intranets to link the businesses with their customers.../...a licenses Apple OS Apple CEO reveals new strategy Chess: Kasparov beats Deep Blue NEC 'Digital Watermark' technology Week of February 12 - February 16 / 1996 New Fax standard to incorporate...
/...he third and fourth were draws, and Kasparov won the last two games. Back to top NEC 'Digital Watermark' technology [February 20/96] NEC Corporation has developed technology that will digitally mark.../...eo, and multimedia data as well as text and images. Unlike conventional encryption systems, the digital watermark stays embedded in the data and remains unaffected by digital-analogue conversions.image scaling o...

R2: 299.931 ■ tigermarktwo.html A 7m 4k http://intermedia-design.com/tigermarktwo.html
...tigermarktwo.html NEC TigerMark DataBlade Module for Images From Informix and NEC What is Watermarking?.../... NEC TigerMark DataBlade Module for Images From Informix and NEC What is Watermarking? With the advent of digital communication, including the I.../...ng the Internet, make it easy to transmit and redistribute perfect copies of digital data. Now with NEC is TigerMark technology, you can custom watermark your images permanently and securely, without de.../...es permanently and securely, without degrading the quality of the content. NEC has developed a digital watermarking technology that solves this problem for today is content providers. NEC is TigerMark is a digit.../...erever your content goes, your watermark goes, too. NEC provides a powerful tool Digital watermark NEChas developed a digital Watermarking technology that meets the needs of today is busines.../...s, too. NEC provides a powerful tool digital watermark NEC has developed a digital Watermarking technology that meets the needs of today is business environment. NEC is digital watermark Tige...

R3: 299.89 ■ Focus on Internet H 1m 9k http://www.esi.es/Information/SWT/R_0/I196/four.html
...ERNET NEWS 24 HOURS IN CYBERSPACE PARTS OF INTERNET GO BLACK IN PROTEST OVER NEW LAW NEC DEVELOPS DIGITAL WATERMARK TECHNOLOGY INTERESTING SITES KFKI RESEARCH INSTITUTE FOR MEASUR.../...arian groups and individuals. Sunday February 11 This is an excerpt Source: Reuters NEC DEVELOPS DIGITAL WATERMARK TECHNOLOGY PRINCETON, N.J.-
NEC says scientists at its NEC Research .../...an excerpt Source: Reuters NEC DEVELOPS DIGITAL WATERMARK TECHNOLOGY PRINCETON, N.J.- NEC says scientists at its NEC Research Institute have developed a digital watermarking method for use.../...WS 24 HOURS IN CYBERSPACE PARTS OF INTERNET GO BLACK IN PROTEST OVER NEW LAW NEC DEVELOPS DIGITAL WATERMARK TECHNOLOGY INTERESTING SITES KFKI RESEARCH INSTITUTE FOR MEASUREMENT AND COMPUTING TECHNIQ.../...and individuals. Sunday February 11 This is an excerpt Source: Reuters NEC DEVELOPS DIGITAL WATERMARK TECHNOLOGY PRINCETON, N.J. - NEC says scientists at its NEC Research Institute have developed a .../...K TECHNOLOGY PRINCETON, N.J. - NEC says scientists at its NEC Research Institute have developed a digital watermarking method for use in protecting copyrighted audio, image, video and multimedia data. The company s...

[...section deleted...]

FIG. 5

| Only 1 search term was found in these documents: |

| 1 | ☐ ARIS Technologies' Homepage H 16d 2k http://www.musicode.com/welcome.html
...ARIS Technologies' Homepage ARIS Technologies is an industry leader in digital watermarking. We deal exclusively with protecting intellectual property such as audio, video, and multimedia... |

| 1 | ☐ Psych 267 Final Projects A n/a-8k http://white.standford.edu/~heeger/psych267/final.html
...nteractive lighting design. Proceedings Eurographics '95, p. 229-240, 1995 (preprint). Digital watermark. References: Cox, Kilian, Leighton and Shamcon, "A Secure, Imperceptible yet Perceptually sal.../.... IBM Tech. Report (preprint available). Further links to other papers and resources on digital watermarks. Face recognition with 'eigenfaces'. References: Turk and Pentland, "Face recognition u... |

| 1 | ☐ Digimarc receives funding of $4.5M. N n/a 6k http:..www.nlsearch.com/cgi-bin/pdserv.pl?cbrecid=YY19970425030163059&ho=typhoon&pa=5005
...Summary: First licensee is Adobe. Digimarc, the company that last year announced its Imagemarc digital watermark technology, seems to be ready to make its move in the market. ... |

| 1 | ☐ Newsbytes Daily Summary N 0d 28k http://newsbytes.mpx.com.au/newsbytes/daily.html
...Lernout & Hauspie [NASDAQ:LHSPF] (LSH) of Burlington, Massachusetts, and Ieper, Belgium. CHIPS NEC Develops World's Smallest Transistor TOKYO, JAPAN, 1997 SEP 11 (NB) - By Martyn Williams. NEC Co.../...PS NEC Develops World's Smallest Transistor TOKYO, JAPAN, 1997 SEP 11 (NB) - By Martyn Williams. NEC Corporation [TOKYO:6701] says it has developed the world's smallest operational transistor, a me.../...te length of 14 nanometers (14 millionths of a millimeter). The achievement was reached as part of NEC's development of a 10 terabit memory chip. Intel Advances Mobile PC Platform HONG KONG, CHINA... |

| 1 | ☐ A letter from the publisher TIME, December 6, 1971 L ly 3k http://electron.rutgers.edu/~myadav/war71/wall/dec6a.html
...tough warning to India. But the only evidence of war that night was the blackout which was quite unnecessary." From the correspondents' files, and from background research assembled by Reporter-Res... |

FIG. 6

> No search terms were found in these documents:

[ ] 0  Article Two H 1y 1k http://miavx1.muohio.edu/~whittijs/articletwo.html
Userdir rule failure The server was unable to resolve the requested / username reference, possible causes include: Username invalid Server is unable to determine username's login directory due to insufficient privilege to

[ ] 0  Jonathan G. Campbell, University of Ulster, N. Ireland, WWW Links I n/a 1k http://www.iscm.ulst.ac.uk/~jon/book/
J.G. Campbell's Bookmarks From 27 August 1997 this page is *permanently* relocated to
http://www.infm.ulst.ac.uk/jgc/book Updated 27 August 1997 - JG. Campbell@ulst.ac.uk

[ ] 0  CIOS/Conserve WWW server address has changed L 5m 1k
http://cios.llc.rpi.edu:4997/mailboxes/comgrads\08085104.118
CIOS/Conserve WWW server address has changed The CIOS web server address has changed. It is now
http://www.cios.org Please note too the new email address for the Conserve email interface to

[ ] 0  DEFINE IMAGE L 9m 2k http://iram.fr/doc/sic/node58.html
DEFINE IMAGE Next: DEFINE/LIKE Up: DEFINE Previous: DEFINE HEADER DEFINE IMAGE DEFINE
IMAGE Var1 File1 Key1 [Var2 File2 Key2 [ ...]]{ /GLOBAL]

[ ] 0  Arizona Off-Road L 3m 3k http://www.azoffroad.com
Arizona Off-Road  1833 W. Mountain View Road Phoenix, AZ 85021 ATC's MOTORCYCLES JET SKIS GO CARTS

[ ] 0  Résultats dans les cantons L 21d 5k http://admin.ch/ch/f/pore/va/19840226/can316.html
Votation no 316 - Résultats dans les cantons Tableau récapitulatif / deutsch Votation no 316 Résultats dans les cantons Arrêté fédéral concernant la perception d'une redevance sur le trafics des poids lourds du 24 juin 19

[ ] 0  "We Know How the Parisians Felt" L 1y 6k http:///electron.rutgers.edu/~myadav/war71/wall/dec27b.html
"We Know How the Parisians Felt" "We Know How the Parisians Felt" Section: Box ,Page, TIME, Dec. 27, 1971
Time Correspondent Dan Coggin, who covered the war from Pakistani side, was in Dacca when that city
surrendered. His repor

[ ] 0  The U.S.:A Policy in Shambles L 1y 6k http://electron.rutgers.edu/~myadav/war71/wall/dec20b.html
The U.S :A Policy in Shambles The Nixon Administration drew a fusillade of criticism last week for its policy on
India and Pakistan. Two weeks ago, when war broke out between two traditional enemies, a State Department
spokesman issued

[ ] 0  ClariNet Tearsheet: Government, Business, and General News N 0d 8k http://www.clari.net/Samples/nb-other.html
ClariNet Tearsheet: Government, Business, and General News ClariNet *ClariNet Tearsheet: Government,
Businesss, and General News ClariNet Tearsheet: Government, Business, and General News This summary of
computer and technology news is

FIG. 7

```
Pages with duplicate context strings to a page above:
```

▪ Vol. 1.No. 19 A ly 18k http://www.media.sbexpos.com/BULL/BUL0119.HTM
▪ Alternate H ly 18k http://www.seyboldreport.com/BULL/BUL0119.HTM
...ore than five million members Presstek floats additional stock Perlsetters launched in Europe NEC announces
digital watermark Oracle to include software suite with Internet box Ca.../...-BT have launched Presstek's
Pearlsetters in seven European countries. Reuters reports that NEC claims to have develped a digital watermark
system that could protect digital files.../...n members Presstek floats additional stock Pearlsetters launched in
Europe NEC announces digital watermark Oracle to include software suite with Internet box Canon combines
divisions within a I.../...ters in seven European countries. Reuters reports that NEC claims to have developed a
digital watermark system that could protect digital files, such as still images, video and audio, from unauth...

☐ (http://www.videodiscovery.com/vdyweb/dvd/dvdfaq.txt) H lm 118k
http://www.videodiscovery.com/vdyweb/dvd/dvdfaq.txt
...a on NTSC line 21. The digital standard (CGMS/D) is not yet finalized, but will apply to digital connections such
as IEEE 1394/Firewire. 3)Because of the potential for perfect digital copies, paranoid.../...isplaying it. No
unscrambled digital output is allowed until work in progress for secure digital connections is finished. On the
computer side, DVD-ROM drives and video display/decoder hardware or softw.../...d a PCM audio track. (Other
streams such as Dolby Digital audio, MPEG audio, and subpicture are not necessary for the simplest case.) Basic
DVD control codes are also needed. At the moment it's difficul.../...doing this, but it's possible. The music industry
is also requesting an "embedding signalling" or "digital watermark" copy protection feature. This applies a digital
signature to the audio in the form of supposedly...

▪ Hyflex J1 Launch H 3m 3k http://jpn.co.jp/jan96/jp14.html
▪ Hyflex J1 Launch H 3m 3k http://jpn.co.jp/feb96/jp14.html
...Hyflex J1 Launch NEC Develops Digital Watermarking Technique JPN Scientists at NEC Research Institut...
/...nch NEC Develops Digital Watermarking Technique JPN Scientisils at NEC Research Institute in Princeton,
NJ, have developed a digital watermarking method that could be us.../...ary information is increasingly an issue,"
said Tatsuo Ishigoro, associate senior vice president of NEC Corp. "...I am convinced that our watermarking
technique is a solution that will be welcomed espec.../...Hyflex J1 Launch NEC Develops Digital Watermarking
Technique JPN Scientists at NEC Research Institue in Princeton, NJ, have de.../...ique JPN Scientists at NEC
Research Institute in Princeton, NJ, have developed a digital watermarking method that could be used to protect
the copyright of images and music on the Internet. Con.../...e is no way to track its reproduction and therefore it
provides little protection against piracy. A digital watermark, however, can protect a copyright by means of an
invisible identification code that is permanently...

▪ Internet H n/a 20k http://net.info.nl/ui/0256/internet.html
...tscape servers. Dit kwam o.a. door het feit dat bepaalde optionele onderdelen zoals een database-connector duur
betaald moeten worden. Microsoft op zijn beurt deed daar weer een schepje bovenop door we...
/...://www.microsoft.com/infoserv.http://www.microsoft.com/windows http://www.netscape.com NEC ontwikkelt
Digital Watermark Technology NEC is in zijn computerlaboratoriums bezig met een digit...
/...microsoft.com/windows http://www.netscape.com NEC ontwikkelt Digital Watermark Technology NEC is in
zijn computerlaboratoriums bezig met een digitaal watermerk. Dit watermerk moet in de tockom.../...t.com/infoserv
http://microsoft.com/windows http://www.netscape.com NEC ontwikkelt Digital Watermark Technology
NEC is in zijn computerlaboratoriums bezig met een digitaal watermerk. Dit watermerk...

FIG. 8

| These documents no longer exist: |
|---|

Error 404 Not found - file doesn't exist or is read protected [even tried multi] Digital Image Watermarking: Main Project Page http://www.csuglab.cornell.edu/Info/People/vbadari/cs631/wrnrkproj/project.html
Error 404 Not found Labeling Techniques for Multimedia Data: http://www-it.et.tudelft.nl/pda/smash/public/benelux_.cr.html
Error 404 Not found Labeling Techniques for Multimedia Data: http://www-it.et.tudelft.nl/pda/smash/public/benlx96/benelux.cr.html
Error 404 Not Found Artisoft Inc. - Industry Awards and Recognition http://artisoft.com/main/overview/awards.html
Error 404 File Not Found The Rutgers Review http://electron.rutgers.edu/~nebus/

This search: +nec +'digital watermark' Search engine pages: AltaVista Page 2 Page 3 Excite Page 2 HotBot Page 2 Infoseek Lycos Northern Light Page 2 WebCrawler Yahoo Query expansion (adding these words to the query may help): digitally(16) digitized(16) digit(9) digitale(8) digitaal(8) digitization(5) digits(3) digitize(3) watermarking(463) watermarks(127) watermarked (50)

| Engine | Response | Total | Retrieved | Processed | Duplicates |
|---|---|---|---|---|---|
| AltaVista | Yes | 29 | 29 | 29 | 11 |
| Excite | Yes | 26 | 26 | 26 | 13 |
| HotBot | Yes | 39 | 39 | 33 | 5 |
| Infoseek | Yes | 19 | 19 | 17 | 0 |
| Lycos | Yes | 10 | 10 | 10 | 0 |
| Northern Light | Yes | 50 | 50 | 33 | 19 |
| WebCrawler | Yes | 1 | 1 | 0 | 0 |
| Yahoo | Yes | 0 | 0 | 0 | 0 |
| Total | | 174 | 174 | 148 | 48 |
| More documents were found but the maximum number of hits was reached. ||||||

| 2 terms:70   1 term:5   0 terms:11   duplicate context:9   invalid link:5 |
|---|

| Jump to: nec(2)   digital watermark(2)   http://www.neci.nj.nec.com/tr/neci-abstract-95-10.html   [Track page] |

NECI Technical Report 95-10

NEC Research Institue, 4 Independence Way, Princeton, NJ 08540.

Secure Spread Spectrum Watermarking for Multimedia

Ingemar J. Cox, Joe Kilian, Tom Leighton, and Talal Shamoon. December 4, 1995.

We describe a digital watermarking method for use in audio, image, video and multimedia data. We argue that a watermark must be placed in perceptually significant components of a signal if it is to be robust to common signal distortions and malicious attack. However, it is well known that modification of these components can lead to perceptual degradation of the signal. To avoid this, we propose to insert a watermark into the spectral components of the data using techniques analogous to spread spectrum communications, hiding a narrow band signal in a wideband channel that is the data. The watermark is difficult for an attacker to remove, even when several individuals conspire together with independently watermarked copies of the data. It is also robust to common signal and geometric distortions such as digital-to-analog and anlog-to-digital conversion, resampling, and requantization, including dithering and recompression and rotation, translation, cropping and scaling. The same digital watermarking algorithm can be applied to all three media under consideration with only minor modifications, making it especially appropriate for multimedia products. Retrieval of the watermark unambiguously identifies the owner, and the watermark can be constructed to make counterfeiting almost impossible. Experimental results are presented to support these claims.

FIG. 13

This search: koala  Search engine pages: AltaVista Images  Corel Images  HotBot Images  Page 2  Page 3  Page 4  Page 5  Page 6  Lycos Images  Page 2  Page 3  Page 4  Page 5  WebSeer  Yahoo Images

| Engine | Response | Total | Retrieved | Processed | Duplicates |
|---|---|---|---|---|---|
| AltaVista Images | Yes | 0 | 0 | 0 | 0 |
| Corel Images | Yes | 7 | 7 | 7 | 0 |
| HotBot Images | Yes | 5511 | 125 | 99 | 1 |
| Lycos Images | Yes | 222 | 80 | 85 | 1 |
| WebSeer | Yes | 0 | 0 | 0 | 0 |
| Yahoo Images | Yes | 4 | 4 | 4 | 1 |
| Total | | 5744 | 216 | 195 | 3 |

More documents were found but the maximum number of hits was reached.

Filtered due to size: 12  Filtered due to type: 21

FIG. 14

| Home | Options | Help | Suggestions | Problems | NECI meta search (13413 queries) |

Find: [Koala]

| Web & Usenet | Web | Usenet | Press | Images | Citations | Journals | Tech | All |

(Hide) Constraints:
Locality: [Any] Age limit: [None] Depth: [Any] Images: [Graphic]

(Hide) Options:
Hits: [100] Context: [100] Cluster [No] Tracking [No]

Searching for: koala using: WebSeer Corel Lycos Yahoo HotBot AltaVista

Tip: You can search for links to a specific page, e.g. link:www.neci.nj.nec.com/homepages/giles. Self links are excluded.

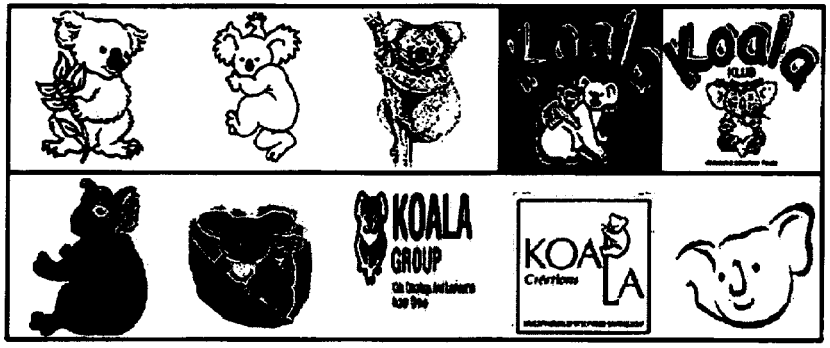

More images were found but the maximum number of hits was reached

This search: koala Search engine pages: AltaVista Images Corel Images HotBot Images Lycos Images Page 2 Page 3 Page 4 Page 5 Page 6 Page 7 WebSeer Yahoo Images

| Engine | Response | Total | Retrieved | Processed | Duplicates |
|---|---|---|---|---|---|
| AltaVista Images | Yes | 0 | 0 | 0 | 0 |
| Corel Images | Yes | 7 | 7 | 7 | 0 |
| HotBot Images | Yes | 0 | 0 | 0 | 0 |
| Lycos Images | Yes | 217 | 120 | 128 | 5 |
| WebSeer | Yes | 0 | 0 | 0 | 0 |
| Yahoo Images | Yes | 4 | 4 | 4 | 1 |
| Total | | 228 | 131 | 139 | 6 |

More documents were found but the maximum number of hits was reached.

Filtered due to size: 2    Filtered due to type: 61

FIG. 15

| Clusters: |
|---| university of texas
artificial neural networks     70
jose nelson amaral
classifiers kagan tumer
department of electrical
combined neural classifiers
applying genetic algorithms
hybrid intelligent architecture OR hybrid intelligent architecture AND systems
radial basis function
classifier boundary distributions
estimating the bayes
boundaries in linearly
pattern recognition
tx 78712
ismail taha
kagan pine
international conference
systems
abstract
paper
austin
ece
utexas

FIG. 16

---
Cluster summaries:
---

---
university of texas
---

Document:...by clicking on Journal Papers: Ismail Taha and Joydeep Ghosh, "A Hybrid Intelligent Architecture and It's Application to Water Reservo.../...d to Journal of Smart Engineering Systems. Ismail Taha and Joydeep Ghosh, "Symbolic Interpretation of Artificial Neural Networks", submitted .../...Austin, 1996. Conference Papers: Ismail Taha and Joydeep Ghosh, "Evaluation and Ordering of Rules Extracted from Feedforward Networks.../...Also, Tech. Rep. TR-97-01-106, The Computer and Vision Research Center, University of Texas, Austin, 1996. Conference Papers: Ismail Taha an... — 72

Document:...Joydeep Ghosh.../...Joydeep Ghosh Joydeep Ghosh Telephone:(512)471-8980 Fax:(512)471-5... /...Joydeep Ghosh Joydeep Ghosh Telephone:(512)471-8980 Fax:(512)471-5532 E-mail:ghosh@pin.../...Fax: (512)471-5532 E-mail: ghosh@pine.ece.utexas.edu Address: The University of Texas at Austin Department of Electrical & Computer Engineering...

Document:...Yoan Shin and Joydeep Ghosh Department of Electrical and Computer.../...Yoan Shin and Joydeep Ghosh Department of Electrical and Computer Engineering The University of Texas../..in and Joydeep Ghosh Department of Electrical and Computer Engineering The University of Texas at Austin Austin, TX 78712 Abstract This paper introduces a nov...
...more...

---
artificial neural networks
---

Document:...Artificial Neural Networks Authors: Bryan W. Stiles and Joydeep Ghosh Department of Electrical and Computer Engineering The Unive.../...rsity of Texas at Austin Correspondence: Bryan Stiles c/o Joydeep Ghosh Department of Electrical and Computer Engineering The Unive.../...Phone:(512)471-2358 Email: bstiles@pine.ece.utexas.edu Joydeep Ghosh Department of Electrical and Computer Engineering The Univ.../...A Habituation Based Mechanism for Encoding Temporal Information in Artificial Neural Networks Authors:Bryan W. Stiles and Joydeep Ghosh Department o.../...1:ghosh@pine.ece.utexas.edu Submit to: Applications and Science of Artificial Neural Networks Steven K. Rogers and Dennis W. Ruck at AeroSense '9...

Document:...(eds.), IEEE Press, 1995. pp 135 - 144, Bryan W. Stiles and Joydeep Ghosh, "A Habituation Based Mechanism for Encoding Temporal Information in Arti.../...E Proc. Vol., Orlando, April 1995. pp. Bryan W. Stiles and Joydeep Ghosh, "Habituation Based Neural Classifiers for Spatio-temporal Signals", Pro.../...Proc. ICASSP-95, Detroit, May 1995. pp. Bryan W. Stiles and Joydeep Ghosh, "Dynamic Neural Networks for the Classification of Oceanographic Data".../...Ghosh, "A Habituation Based Mechanism for Encoding Temporal Information in Artificial Neural Networks", (invited paper) Proc. SPIE Conf. on Applications and Science of Artif.../...tworks", (invited paper) Proc. SPIE Conf. on Applications and Science of Artificial Neural Networks IV, SPIE Proc. Vol., Orlando, April 1995. pp. Bryan W. St...

Document:...uth.edu Larry D. Jackel Robert E. Schapire Y. Freund Kagan Tumer and Joydeep Ghosh Shimon Edelman Jonathan Baxter Anders Krogh and Jesper Vedelsby .../...ftp from "ftp://eris.wisdom.weiamann.ac.il/pub/mam.ps.Z" Kagan Tumer and Joydeep Ghosh, "Theoretical Foundations of Linear and Order Statistics Combiners for Ne.../...When Networks Disagree: Ensemble Methods for Neural Networks", Chapter 10, Artificial Neural Networks for Speech and Vision, editor R.J. Mammone. Chapman-Hall, London 1993 M...
...more...

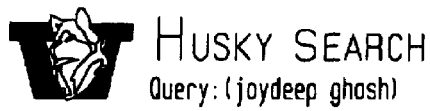

Husky Search
Query: (joydeep ghosh)

Documents: 102, Clusters: 14, Average Cluster Size: 11.21 documents        76

| Document Group | Size | Phrase and Sample Document Titles |
|---|---|---|
| Cluster 1 | 19 | Artificial (74%), Hybrid intelligent (32%), domain knowledge(26%)<br>ORGANIZING COMMITTEE<br>Untitled<br>Abstract<br>Abstract<br>Untitled |
| Cluster 2 | 7 | Click on to view the abstract and on to obtain a postscript copy...(71%), postscript copy of the full paper (100%), paper is currently not available.(57%)<br>Kagan Tumer's Publications<br>Classification<br>Working Papers<br>Refereed Archival Journal Publications (Full/Regular Papers)<br>Technical Reports |
| Cluster 3 | 15 | Kagan Tumer (100%), NEURAL CLASSIFIERS Kagan Tumer and Joydeep ghosh (27%), pattern classifiers (20%), tumer (53%)<br>Untitled<br>Untitled<br>Abstract<br>Abstract<br>Abstract |
| Cluster 4 | 8 | of Electric and Computer (88%)<br>Untitled<br>Untitled<br>LANS Home Page<br>Joydeep Ghosh<br>LANS Home Page |
| Cluster 5 | 31 | e.ece(32%), RESEARCH & EDUCATIONAL RESOURCES/ORGANIZATIONS/ centers (10%), of Texas (10%), er (81%)<br>Untitled<br>Untitled<br>Botch 92 Chemical Engineering<br>LANS Home Page<br>Joydeep Ghosh |
| Cluster 6 | 11 | University of Texas at austin (50%), University of texas (67%), texas (100%)<br>Untitled<br>Untitled<br>LANS Home Page<br>Joydeep Ghosh<br>Joydeep Ghosh |
| Cluster 7 | 3 | ters.Journal (100%)<br>LANS Home Page<br>Refereed Archival Journal Publications (Full/Regular Papers)<br>Refereed Archival Journal Publications (Full/Regular Papers) |

FIG. 18

| Document Group | Size | Phrase and Sample Document Titles |
|---|---|---|
| Cluster 8 | 16 | papers (100%)<br>Kagan Tumer's Publications<br>Classification<br>Kurt's Publications<br>Working Papers<br>Refereed Archival Journal Publications (Full/Regular Papers) |
| Cluster 9 | 2 | ons.Books (100%)<br>LANS Home Page<br>Books/Proceeding...(Edited) |
| Cluster 10 | 8 | (100%)<br>LANS Home Page<br>Associated Members<br>LANS Home Page<br>Associated Members<br>No Title |
| Cluster 11 | 4 | s. Austin (100%)<br>Untitled<br>LANS Home Page<br>LANS Home Page<br>No Title |
| Cluster 12 | 11 | combining (100%), outputs (64%)<br>Abstract<br>Abstract<br>Abstract<br>Untitled<br>Abstract |
| Cluster 13 | 8 | ted (100%)<br>LANS Home Page<br>Kagan Tumer's Publications<br>CIS Publications Database<br>Kurt's Publications<br>Refereed Archival Journal Publications (Full/Regular Papers) |
| Cluster 14 | 13 | e (100%)<br>LANS Home Page<br>Joydeep Ghosh<br>JOYDEEP GHOSH<br>Joydeep Ghosh<br>LANS Home Page |
| Unclustered | 3 | Musical Events in Mumbai<br>Batch-Wise Mailing Lists and Home Pages for IITK<br>Publicações de José Nelson Amaral |

FIG. 19

Refine your search by requiring a few relevant topics,
excluding irrelevant ones and ignoring the others.

- 26% Ghosh, neural, artificial, networks, sonar, austin, classification, texas, signals
- 24% Orthod, orthodontics, orthodontic, orthop, orthodontists, mandibular, maxillary, nanda craniofacial
- 23% Classifiers, kagan, classifier, combiners, combining, recognition, pattern, proceedings, ensemble
- 18% Dds, dad, bds, incisors, msd, phd
- 16% Ieee, spie, associative, annealing
- 15% Wavelets, fuzzy, prof
- 14% Molars, maxilla, mandible
- 14% Generalization, supervised, adaptation, vol, estimation
- 12% Ece, electrical, engineering, utexas Help . Preferences . New Search . Advanced Search Our Network | Add/Remove Url | Feedback | Help
Advertising Info | About AltaVista | Jobs | Text-Only Digital Equipment Corporation Disclaimer | Privacy Statement
Copyright 1997© All Rights Reserved

| Clusters: |
|---| artificial neural networks     84
networks neural networks
ieee international conference
university of texas
pacific northwest laboratory
recurrent neural networks
nnw in hep
pacific northwest national
university of california
austrian research institute
self organizing map
northwest national laboratory
artificial intelligence
pattern recognition
research group
international conference
fuzzy logic
san diego
genetic algorithms
ieee transactions
signal processing
pacific northwest
technical report
machine learning
data
nets
ai
software

FIG. 21

Clusters:

carpal tunnel syndrome
repetitive stress injuries
software monitoring tools
contain useful advice
repetitive strain injuries
san jose state OR san jose state AND archive
kinds of documents
university of nebraska
htm diana carroll
products include split
dan wallach
keyboard alternatives
interest finder OR browse groups
human factors
tifaq general
injuries
related
archive
resources
contain useful advice AND resources OR contain useful advice AND keyboard alternatives
repetitive stress injuries AND keyboard alternatives
repetitive stress injuries AND dan wallach

86 carpal tunnel sydrome

Document:...FAQ - Typing Injury.../...Typing Injury FAQ Home Page [TIFAQ][General][Keyboards][Speech][Mice][Sof... ...FAQ - Typing Injury .../... Typing Injury FAQ Home Page [TIFAQ][General][Keyboards][Speech][Mice][Software] .../...Injury Archive. sources of information for people with typing injuries, repetitive stress injuries, carpal tunnel syndrome, etc.. The TIFAQ is targeted at computer users suffering at the hands of their equipment. You'...

Document:...JCM's Ergonomics Page is a site by John Murray at University of Michigan that focuses on typing injuries, carpal tunnel syndrome and design concepts. Office Working Postures is a comme.../...eral links to various safety oriented servers, lists, and newsgroups. You do the searching. Typing Injuries is everything you ever wanted to know about typing injuries by Dan Wallach at Princeto.../...Princeton. Lots of publications and links. Everything you wanted to know and more. Typing Injury Archive is a typing injury library by Dan Wallach at Princeton. Here you will find a well cate.../...ons and links. Everything you wanted to know and more. Typing Injury Archive is a typing injury library by Dan Wallach at Princeton. Here you will find a well categorized list of typing injury .../...and Ergonomics Home Page links to several ergonomic sites that focus on safety issues, such as: carpal tunnel syndrome, back injuries, air quality, sick building sydrome, and lighting. Lawrence Livermore Lab .../...al technology and human factors engineering. Mostly in-house work but an interesting site. Carpal Tunnel Syndrome is a commercial site but does have lots of references to CTS. Specific emphasis is on keyboard...

Document:...at the keyboard. Site offers Time Out For Windows, an ergonomic exercise break program. Typing Injury FAQ: This is the home page for the Typing Injury FAQ and Typing Injury Archive. .../...an ergonomic exercise break program. Typing Injury FAQ: This is the home page for the Typing Injury FAQ and Typing Injury Archive. NEW! University of Minnesota Office Ergonomics... /...are. how one gets them, and some guidelines for how one may help heal oneself from this devastating injury. Carpal Tunnel Syndrome & Repetitive Stress Computer Related Repetitive St.../...Carpal Tunnel Syndrome & Repetitive Stress Computer Related Repetitive Strain Injury: I hope on this page to provide a very brief introduction to RSI for the benefit of students who.../...em and some guidelines for how one may help heal oneself from this devastating injury .Carpal Tunnel Syndrome & Repetitive Stress Computer Related Repetitive Strain Injury: I hope on this page t.../...pause helps you avoid OOS/RSI with Micropauses and Exercise Breaks. Patient's Guide to Carpal Tunnel Syndrome: The following documents attempt to explain what Carpal Tunnel Syndrome is, how it is diagnosed...

Document:...Typing Injury FAQ: General Information.../...Typing Injury FAQ: General Information General Infomration [TIFAQ] [General][Key.....Typing Injury FAQ: General Information.../...Typing Injury FAQ: General Information General Information [TIFAQ][General][Keyboards].../...nonyn for RSI VRULD Work-Related Upper Limb Disorders - yet another synonym for RSI CTS Carpal Tunnel Syndrome (see below) Hyperextension Marked bending at a joint, Pronation Turning the palm down.../...over the wrist and forearm, some tenderness, and it gets worse with repetitive activity. Carpal Tunnel Syndrome the nerves that run through your wrist into your fingers get trapped by the inflamed mu..
...more...

FIG. 22

| Home | Options | Help | Suggestions | Problems | NECI meta search (14083 queries) |

Find: [what does NASDAQ stand for?]

| Web & Usenet | Web | Usenet | Press | Images | Citations | Journals | Tech | All |

(Show) Constraints:
(Hide) Options:

Hits: [100 ▽] Context: [100 ▽] Cluster [No ▽] Tracking [No ▽]

Searching for: "NASDAQ stands for" "NASDAQ is an abbreviation" "NASDAQ means" using: HotBot Infoseek AltaVista Excite Lycos Northern Light Yahoo WebCrawler.

Tip: For better precision with multiple terms you might like to use "+" to ensure that the results contain specific terms (e.g. + "lee giles" + optics).

Ref:...viation for the New York Stock Exchange AMEX is an abbreviation for the American Stock Exchange
NASDAQ is an abbreviation for the National Associaction of Securities Dealers Automatic Quotation Exchange "Top 5% of the...
Ref:...nformation on NASDAQ and the companies traded theron. (Incidentally, does anyone know what NASDAQ stands for?) NYSE All about the N ew Y ork S tock Exchange. Data mongers loo...
Ref:...- The NASDAQ Last-Revised: 25 Oct 1996 from: billmanr@aol.com, jeffwben@aol.com, cml@cs.umd.edu
NASDAQ is an abbreviation for the National Association of Securities Dealers Automated Quotation system. It is also communl...
Ref"...- NASDAQ Last_Revised: 25 Oct 1996 From: billmanr@aol.com, jeffwben@aol.com, lott@invest-faq.com
NASDAQ is an abbreviation for the National Association of Securities Dealers Automated Quotation system. It is also communl...
Ref"...ble for the operation and regulation of the NASDAQ stock market and overthecounter markets. NASDAQ Stands for the National Association of Securities Dealers Automated Quotation System. A nationwide computeri...
Ref"...site Index is a value weighted index that monitors more than 2.000 stocks traded over-the counter. NASDAQ stands for National Association of Securities Dealers Automated Quotations. It has been available since 1971...
Ref"...as an incentive stock option under Section 422 of the Code. (k) "NASDAQ" means the National Association of Securities Dealers, Inc. Automated Quotation System...

[...section deleted...]

This search: "NASDAQ stands for" "NASDAQ is an abbreviation" "NASDAQ means" Search engine pages:
AltaVista Excite HotBot Infoseek Lycos Northern Light WebCrawler Yahoo

| Engine | Response | Total | Retrieved | Processed | Duplicates |
|---|---|---|---|---|---|
| AltaVista | Yes | 9 | 9 | 9 | 1 |
| Excite | Yes | 24 | 24 | 24 | 1 |
| HotBot | Yes | 23 | 23 | 23 | 4 |
| Infoseek | Yes | 5 | 5 | 5 | 0 |
| Lycos | Yes | 0 | 0 | 0 | 0 |
| Northern Light | Yes | 0 | 0 | 0 | 0 |
| WebCrawler | Yes | 0 | 0 | 0 | 0 |
| Yahoo | Yes | 0 | 0 | 0 | 0 |
| Total | | 61 | 61 | 61 | 6 |

3 terms:0  2 terms:0  1 term:26  0 terms:9  duplicate context:14  cannot access:3  invalid link:3

| Home Options Help Suggestions Problems NECI meta search (13581 queries) |
| Find: how is a rainbow created? |

| Web & Usenet | Web | Usenet | Press | Images | Citations | Journals | Tech | All |

(Show) Constraints:
(Hide) Options:

Hits: 100 ▼ Context: 200 ▼ Cluster No ▼ Tracking No ▼

Searching for: "rainbow is created" "makes a rainbow created" "rainbow is produced" "rainbow is made"
using: HotBot Infoseek AltaVista Excite Lycos Northern Light Yahoo WebCrawler.

Tip: For better precision with multiple terms you might like to use "+" to ensure that the results contain specific terms (e.g. + "lee giles" + optics).

Ref:...the green flash. it helps to know how our atmosphere effects sunlight. Coincidentally, the phenomenon responsible for the green flash is also the one that paints rainbows across Hawaii's sky. A rainbow is created when rays of sunlight enter a raindrop, bounce around inside, and exit. Light from the sun consists of a potpourri of colors that are each bent by a different amount inside a raindrop. This unequa...

Ref:...scapes the raindrop after it is reflected once. A part of the ray is reflected again and travels along inside the drop to emerge from the drop. The rainbow we normally see is called the primary rainbow and is produced by one internal reflection the secondary rainbow arises from two internal reflections and the rays exit the drop at an angle of 50 degrees rather than the 42 degrees for the red primary bow. ...

Ref:...e rainbow we do not see the sun, and we rarely see a rainbow in winter. How do we explain this apperance of a bow, double bows, size of arc, and brightness of the rainbow? Answer The rainbow is produced by sunlight passing through a raindrop or a collection of rain drops. A typical raindrop is spherical and as a light ray strikes the surface of the raindrop, some light is reflected and some passes ...

Ref:...se to us. He promised that the earth will never be destroyed again by a flood. As a sign of that promise He put a rainbow in the sky. Whenever we see a rainbow, we can think of God's promise. The rainbow is made up of all the colors. Back To Index Next Page... Page 1 ...

Ref:...two rainbows. the narrower male rainbow and the wider female. The male rainbow can not stop the rain by itself. When it is followed by the female the rain stops. Other Native Americans believe the rainbow is made from the souls of wild flowers that lived in the forest and lilies from the prairies. A Japanese myth tells of the first man Isanagi and the first woman Isanami who stood on the floating bri.../...te of samsara before the clear light of Nirvana or heaven. In Arabia the rainbow is a tapestry draped by the hands of the south wind. It is also called the cloud's bow or Allah's bow. In Islam the rainbow is made up of four colors, red, yellow, green and blue related to the four elements. In myths of India the Goddess Indra not only carries a thunderbolt like the Greek God Zeus but she also carries a...

Ref:...true b. false 13. The average speed of light is greatest in _.a.red glass.b. orange glass. c. green glass. d. blue glass. e. is the same in all of these. 14. The secondary rainbow is produced with an extra (choose the best answer) a. dispersion. b. reflection. c. refraction. d. diffraction. 15. If a person has green cones that are weak, then yellow light will appear_ to t...

Ref:...ever wonder what makes the color in a rainbow? The answer is sunlight. it has all of the colors of the rainbow in it, but they are all mixed up together so you are not able to see them. The rainbow is made up of drops of water. When sunlight passes through a drop of water, it bends and the colors inside the light split apart and are separated so that we can see them. When the sunlight passes through...

[...section deleted...]

| Home Options Help Suggestions Problems NECI meta search (13674 queries) |
|---|
| Find: |
| Web & Usenet | Web | Usenet | Press | Images | Citations | Journals | Tech | All |
| (Show) Constraints: |
| (Hide) Options: |
| Hits: 50 ▽ Context: 100 ▽ Cluster No ▽ Tracking No ▽ |

Tip: Clicking on the search engine links in the "Searching for" line will show the search engine response to the current query.

Recently modified URLs:

Page ftp://ftp.kernel.org/pub/linux/kernel/testing/ [Stop tracking URL]

Recent documents matching: signafy [Mark as seen][Stop tracking query]

<u>INFORMIX-Universal Server Powers Comprehensive Media Asset Management Package From Virage:</u> ... NW n/a 12k
http://www.infoseek.com/Content?arn=BW1674-1997091536qt=signafy&col=NX&nh=25&kt=A&ak=allnews
... Group The Content Group. Excalibur Technologies Corp. Muscle Fish, LLC Silicon Graphics, Inc. Signafy, Inc.
TECHMATH GmbH and TATA Consultancy Services. About INFORMIX-Universal Server INFORMIX-Un...

<u>INFORMIX-Universal Server Powers Comprehensive Media Asset Management</u> II n/a 13k
http://www.infoseek.com/Content?arn=ix.BWIR199709152152S176X&qt=signafy&col=1X&nh=25&kt=A&ak=industrynews
...roup The Content Group. Excalibur Technologies Corp. Muscle Fish, LLC Silicon Graphics, Inc. Signafy, Inc.
TECHMATH GmbH and TATA Consultancy Services. About INFORMIX-Universal Server I...

| Today at NECI |
|---|
| 9:00 | NJ Prog. Language Workshop - Multipurpose Rooms 2F00 2F01, 2nd Floor,(AW) |
| OUT | Ebbesen, Gottlieb, de Ruyter, <u>Thornber</u> |

Recent articles about NEC Research in the press:

<u>*NEC Research* Promises Terabit Memory Chips</u> NT n/a 20k http://www.techweb.com:80/wire/news/1997/09/0911nec.html
...*NEC Research* Promises Terabit Memory Chips .../... *NEC Research* Promises Terabit Memory Chips .../... Chips
International NEC Research Promises Terabit Memory Chips (09/11/97 12:00 p.m. EDT) By John Boyd. ...

[...section deleted...]

FIG. 28

```
http://www.research.digital.com/SRC/publications/src-papers.html New text:
1. Paul McJones and John DeTreville. Each to Each programmer's reference manual. Technical Note 1997-
   023. Digital Equipment Corporation Systems Research Center, Palo Alto, CA, October 1997.
```

| What's New | Articles | Projects | Publications | Software | Past Work | Directions | Find people |

SRC Publications List

1. Paul McJones and John DeTreville. Each to Each programmer's reference manual. Technical Note 1997-023. Digital Equipment Corporation Systems Research Center, Palo Alto, CA, October 1997.

2. Monika Henzinger and Han La Poutre. Certificates and fast algorithms for biconnectivity in fully-dynamic graphs. Technical Note 1997-021, Digital Equipment Corporation Systems Research Center, Palo Alto, CA, September 1997.

3. Monika Henzinger. Improved data structures for fully dynamic biconnectivity. Technical Note 1997-020, Digital Equipment Corporation Systems Research Center, Palo Alto, CA, September 1997.

4. Monika Henzinger and Valerie King. Maintaining minimum spanning trees in dynamic graphs. Technical Note 1997-019, Digital Equipment Corporation Systems Research Center, Palo Alto, CA, September 1997.

5. Marc Brown, Marc A. Najork, and Roope Raisamo. A Java-based implementation of Collaborative Active Textbooks. In *1997 IEEE Symposium on Visual Languages*, pages 372-379. IEEE Computer Society, September 1997. (PDF), (PostScript), (Copyright 1997 IEEE).

[...section deleted...]

---

Digital Systems Research Center  Legal notice

130 Lytton Avenue, Palo Alto, CA 94301
Tel: (415) 853-2100 Fax: (415) 853-2104

Send comments to the owner of this page.
Last modified: Tuesday, 07-Oct-97 10:32:46 PDT Copyright Digital Equipment Corporation 1995-1997. All Rights Reserved.

COVERAGE WRT 6 ENGINE TOTAL

META SEARCH ENGINE

This application is a conversion of copending provisional application 60/062,958, filed Oct. 10, 1997.

BACKGROUND OF THE INVENTION

A number of useful and popular search engines attempt to maintain full text indexes of the World Wide Web. For example, search engines are available from AltaVista, Excite, HotBot, Infoseek, Lycos and Northern Light. However, searching the Web can still be a slow and tedious process. Limitations of the search services have led to the introduction of meta search engines. A meta search engine searches the Web by making requests to multiple search engines such as AltaVista or Infoseek. The primary advantages of current meta search engines are the ability to combine the results of multiple search engines and the ability to provide a consistent user interface for searching these engines. Experimental results show that the major search engines index a relatively small amount of the Web and that combining the results of multiple engines can therefore return many documents that would otherwise not be found.

A number of meta search engines are currently available. Some of the most popular ones are MetaCrawler, Inference Find, SavvySearch, Fusion, ProFusion, Highway 61, Mamma, Quarterdeck WebCompass, Symantec Internet FastFind, and ForeFront WebSeeker.

The principle motivation behind the basic text meta search capabilities of the meta search engine of this invention was the poor precision, limited coverage, limited availability, limited user interfaces, and out of date databases of the major Web search engines. More specifically, the diverse nature of the Web and the focus of the Web search engines on handling relatively simple queries very quickly leads to search results often having poor precision. Additionally, the practice of "search engine spamming" has become popular, whereby users add possibly unrelated keywords to their pages in order to alter the ranking of their pages. The relevance of a particular hit is often obvious only after waiting for the page to load and finding the query term(s) in the page.

Experience with using different search engines suggests that the coverage of the individual engines was relatively low, i.e. searching with a second engine would often return several documents which were not returned by the first engine. It has been suggested that AltaVista limits the number of pages indexed per domain, and that each search engine has a different strategy for selecting pages to index. Experimental results confirm that the coverage of any one search engine is very limited.

In addition, due to search engine and/or network difficulties, the engine which responds the quickest varies over time. It is possible to add a number of features which enhance usability of the search engines. Centralized search engine databases are always out of date. There is a time lag between the time when new information is made available and the time that it is indexed.

SUMMARY OF THE INVENTION

An object of this invention is to improve meta search engines.

Another object of the present invention is to provide a meta search engine that analyzes each document and displays local context around the query terms.

A further object of this invention is to provide a search method that improves on the efficiency of existing search methods.

A further object of this invention is to provide a meta search engine that is capable of displaying the context of the query terms, advanced duplicate detection, progressive display of results, highlighting query terms in the pages when viewed, insertion of quick jump links for finding the query terms in large pages, dramatically improved precision for certain queries by using specific expressive forms, improved relevancy ranking, improved clustering, and image search.

These and other objectives are attained with a computer implemented meta search engine and search method. In accordance with this method, a query is forwarded to a number of third party search engines, and the responses from the third party search engines are parsed in order to extract information regarding the documents matching the query. The full text of the documents matching the query are downloaded, and the query terms in the documents are located. The text surrounding the query terms are extracted, and that text is displayed.

The engine downloads the actual pages corresponding to the hits and searches them for the query terms. The engine then provides the context in which the query terms appear rather than a summary of the page (none of the available search engines or meta search services currently provide this option). This typically provides a much better indication of the relevance of a page than the summaries or abstracts used by other search engines, and it often helps to avoid looking at a page only to find that it does not contain the required information. The context can be particularly helpful whenever a search includes terms which may occur in a different context to that required. The amount of context is specified by the user in terms of the number of characters either side of the query terms. Most non-alphanumeric characters are filtered from the context in order to produce more readable and informative results.

Results are returned progressively after each individual page is downloaded and analyzed, rather than after all pages are downloaded. The first result is typically displayed faster than the average time for a search engine to respond. When multiple pages provide the information required, the architecture of the meta engine can be helpful because the fastest sites are the first ones to be analyzed and displayed.

When viewing the full pages corresponding to the hits, these pages are filtered to highlight the query terms and links are inserted at the top of the page which jump to the first occurrence of each query term. Links at each occurrence of the query terms jump to the next occurrence of the respective term. Query term highlighting helps to identify the query terms and page relevance quickly. The links help to find the query terms quickly in large documents.

Pages which are no longer available can be identified. These pages are listed at the end of the response. Some other meta search services also provide "dead link" detection, however the feature is usually turned off by default and no results are returned until all pages are checked. For the meta search engine of this invention however, the feature is intrinsic to the architecture of the engine which is able to produce results both incrementally and quickly.

Pages which no longer contain the search terms or that do not properly match the query can be identified. These pages are listed after pages which properly match the query. This can be very important—different engines use different relevance techniques, and if just one engine returns poor relevance results, this can lead to poor results from standard meta search techniques.

The tedious process of requesting additional hits can be avoided. The meta search engine understands how to extract the URL for requesting the next page of hits from the individual search engine responses. More advanced detection of duplicate pages is done. Pages are considered duplicates if the relevant context strings are identical. This allows the detection of a duplicate if the page has a different header or footer.

U.S. Pat. No. 5,659,732 (Kirsch) presents a technique for relevance ranking with meta search techniques wherein the underlying search engines are modified to return extra information such as the number of occurrences of each search term in the documents and the number of occurrences in the entire database. Such a technique is not required for the meta search engine of this invention because the actual pages are downloaded and analyzed. It is therefore possible to apply a uniform ranking measure to documents returned by different engines. Currently, the engine displays pages in descending order of the number of query terms present in the document (if none of the first few pages contain all of the query terms, then the engine initially displays results which contain the maximum number of query terms found in a page so far). After all pages have been downloaded, the engine then relists the pages according to a simple relevance measure.

This measure currently considers the number of query terms present in the document, the proximity between query terms, and term frequency (the usual inverse document frequency may also be useful (Salton, G. (1989), Automatic text processing: the transformation, analysis and retrieval of information by computer, Addison-Wesley.)

$$R = c_1 N_p + \left( c_2 - \frac{\sum_{i=1}^{N_p-1} \sum_{j=i+1}^{N_p} \min(d(i,j), c_2)}{\sum_{k=1}^{N_p-1} (N_p - k)} \right) / \frac{c_2}{c_1} + \frac{N_t}{c_3}$$

where $N_p$ is the number of query terms that are present in the document (each term is counted only once), $N_t$ is the total number of query terms in the document, $d(i, j)$ is the minimum distance between the ith and the jth of the query terms which are present in the document (currently in terms of the number of characters), $c_1$ is a constant which controls the overall magnitude of the relevance measure R, $c_2$ is a constant specifying the maximum distance between query terms which is considered useful, and $c_3$ is a constant specifying the importance of term frequency (currently $c_1=100$, $C_2=5000$, and $c_3=10C_1$) This measure is used for pages containing more than one of the query terms; when only one query term is found the term's distance from the start of the page is used.

This ranking criterion is particularly useful with Web searches. A query for multiple terms on the Web often returns documents which contain all terms, but the terms are far apart in the document and may be in unrelated sections of the page, e.g. in separate Usenet messages archived on a single Web page, or in separate bookmarks on a page containing a list of bookmarks.

The engine does not use the lowest common denominator in terms of the search syntax. The engine supports all common search formats, including boolean syntax. Queries are dynamically modified in order to match each individual query syntax. The engine is capable of tracking the results of queries, automatically informing users when new documents are found which match a given query. The engine is capable of tracking the text of a given page, automatically informing the user when the text changes and which lines have changed. The engine includes an advanced clustering technique which improves over the clustering done in existing search engines. A specific expressive forms search technique can dramatically improve precision for certain queries. A new query expansion technique can automatically perform intelligent query expansion.

Additional features which could easily be added to the meta search engine of this invention include: Improved relevance measures, Alternative ordering methods, e.g. by site, Field searching e.g. page title, Usenet message subject, hyperlink text, Rules and/or learning methods for routing queries to specific search engines, Word sense disambiguation, and Relevance feedback.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 shows the options page of the meta search engine of this invention.

FIGS. 3–8 show, respectively, first through sixth portions of a sample response of the meta search engine of the present invention for the query nec and "digital watermark."

FIG. 9 shows a sample page view for the meta search engine of this invention.

FIG. 13 shows a second portion of a sample response of the meta search engine of this invention for the query koala in the image databases, filtered for photos.

FIG. 14 shows a sample response of the meta search engine of this invention for the query koala in the image databases, filtered for graphics.

FIG. 15 shows clusters for the query "joydeep ghosh."

FIG. 16 shows the first two cluster summaries for the query "joydeep ghosh."

FIG. 17 shows the first part of the clusters for the query "joydeep ghosh" from HuskySearch.

FIG. 18 shows the second part of the clusters for the query "joydeep ghosh" from HuskySearch.

FIG. 19 shows clusters for the query "joydeep ghosh" from AltaVista.

FIG. 20 shows clusters produced by the meta search engine of this invention for the query "neural network."

FIG. 21 shows clusters produced by the meta search engine of this invention for the query typing and injury along with the first cluster summary.

FIG. 22 shows the response of the meta search engine of the present invention for the query What does NASDAQ stand for?

FIG. 24 shows the response of the meta search engine of this invention for the query How is a rainbow created?

FIG. 27 shows a sample home page showing new hits for a query and recently modified URLs.

FIG. 28 shows a sample page view showing the text which has been added to the page since the last time it was viewed.

DETAILED DESCRIPTION OF THE PREFERRED EMBODIMENTS

One of the fundamental features of the meta search engine of this invention is that it analyzes each document and displays local context around the query terms. The benefit of displaying the local context, rather than an abstract or summary of the document, is that the user may be able to more readily determine if the document answers his or her specific query. In essence, this technique admits that the computer may not be able to accurately determine the relevance of a particular document, and in lieu of this ability, formats the information in the best way for the user to quickly determine relevance. A user can therefore find documents of high relevance by quickly scanning the local context of the query terms. This technique is simple, but can be very effective, especially in the case of Web search where the database is very large, diverse, and poorly organized.

The idea of querying and collating results from multiple databases is not new. Companies like PLS, Lexis-Nexis, and verity have long since created systems which integrate the results of multiple heterogeneous databases. Many other Web meta search services exist such as the popular and useful MetaCrawler service. Services similar to MetaCrawler include SavvySearch, Inference Find, Fusion, ProFusion, Highway 61, Mamma, Quarterdeck WebCompass, Metabot, Symantec Internet FastFind, and WebSeeker.

Figure 1:
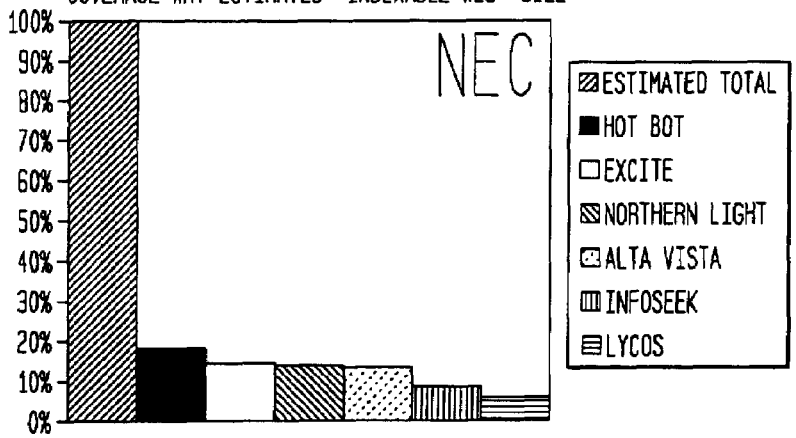
FIG. 1 shows the home page of the meta search engine of this invention.

FIG. 1 shows the home page of the meta search engine of this invention. The bar 12 at the top contains links for the options page, the help page, and the submission of suggestions and problems. Queries are entered into the "Find:" box 14. The selection of which search engines to use for the query is made by clicking on the appropriate selection on the following line. The options are currently:

1. Web—standard Web search engines: (a) AltaVista, (b) Excite, (c) Infoseek, (d) HotBot, (e) Lycos, (f) Northern Light, (g) WebCrawler, and (h) Yahoo.

2. Usenet Databases—indexes of Usenet newsgroups: (a) AltaVista, (b) DejaNews, (c) Reference.com.

3. Press—indexes of press articles and news wires: (a) Infoseek NewsWire, Industry, and Premier sources—c/o Infoseek—Reuters, PR NewsWire etc., and (b) NewsTracker—c/o Excite—online newspapers and magazines.

4. Images—image indexes: (a) Corel—corel image database, (b) HotBot—HotBot images, (c) Lycos—Lycos images, (d) WebSeer—WebSeer images, (e) Yahoo—Yahoo images, and (f) AltaVista—AltaVista images.

5. Journals—academic journals: (a) Science.

6. Tech—technical news: (a) TechWeb and (b) ZDNet.

7. All—all of the above.

The constraints menu 16 follows which contains options for constraining the results to specific domains, specific page ages, and specific image types. The main options menu 20 follows which contains options for selecting the maximum number of results, the amount of context to display around the query terms (in characters), and whether or not to activate clustering or tracking.

The options link on the top bar allows setting a number of other options, as shown at 22 in FIG. 2. These options are: 1. The timeout (per individual page download), 2. Whether or not to filter the pages when viewed, 3. Whether or not to filter images from the pages when viewed, 4. Whether each search displays results in a new window or not, and 5. Whether or not to perform image classification (for manual classification of images). Additionally, the options page shows at 24 and 26 which queries and URLs are being tracked for changes, and allows entering a new URL to track.

FIGS. 3 to 8 show a sample response of the meta search engine of this invention for the query nec and "digital watermark". FIG. 3 shows the top portion of the response from the search. The search form can be seen at the top, followed by a tip 30 which may be query sensitive. Results which contain all of the query terms are then displayed as they are retrieved and analyzed (as mentioned before, if none of the first few pages contain all of the query terms then the engine initially displays results which contain the maximum number of query terms found in a page so far). The bars 32 to the left of the document titles indicate how close the query terms are in the documents—longer bars indicate that the query terms are closer together. The engine which found the document, the age of the document, the size of the document, and the URL follow the document title.

After the pages have been retrieved, the engine then displays the top 20 pages ranked using term proximity information (FIG. 4). In descending order, and referring to FIGS. 5 to 8, the engine then displays those pages which contain fewer query terms, those pages which contain none of the query terms, those pages which contain duplicate context strings, and those pages which could not be downloaded. Links to the search engine pages which were used are then provided, followed by terms which may be useful for query expansion. With reference to FIG. 8, the engine then displays a summary box with information on the number of documents found from each individual engine, the number retrieved and processed, and the number of duplicates.

FIG. 9 shows a sample of how the individual pages are processed when viewed. The links 40 at the top jump to the first occurrence of the query terms in the document, and indicate the number of occurrences. The [Track Page] link activates tracking for this page—the user will be informed when and how the document changes.

The engine comprises two main logical parts: the meta search code and a parallel page retrieval daemon. Pseudocode for (a simplified version of) the search code is as follows:

Process the request to check syntax and create.. ..regular expressions which are used to match query.. ..terms
Send requests (modified appropriately) to all.. ..relevant search engines
Loop for each page retrieved until maximum number.. ..of results or all pages retrieved
    If page is from a search engine
        Parse search engine response extracting hits.. ..and any link for the next set of results
        Send requests for all of the hits
        Send requests for the next set of results.. ..if applicable
    Else
        Check page for query terms and create.. ..context strings if found
        Print page information and context strings if all.. ..query terms are found and duplicate context.. ..strings have not been encountered before
    Endif
End loop
Re-rank pages using proximity and term frequency.. ..information
Print page information and context strings for pages.. ..which contained some but not all query terms
Print page information for pages which contained no.. ..query terms
Print page information and context strings for pages.. ..which contain duplicate context strings
Print page information for pages which could not be.. ..downloaded
Print summary statistics.

Figure 10:
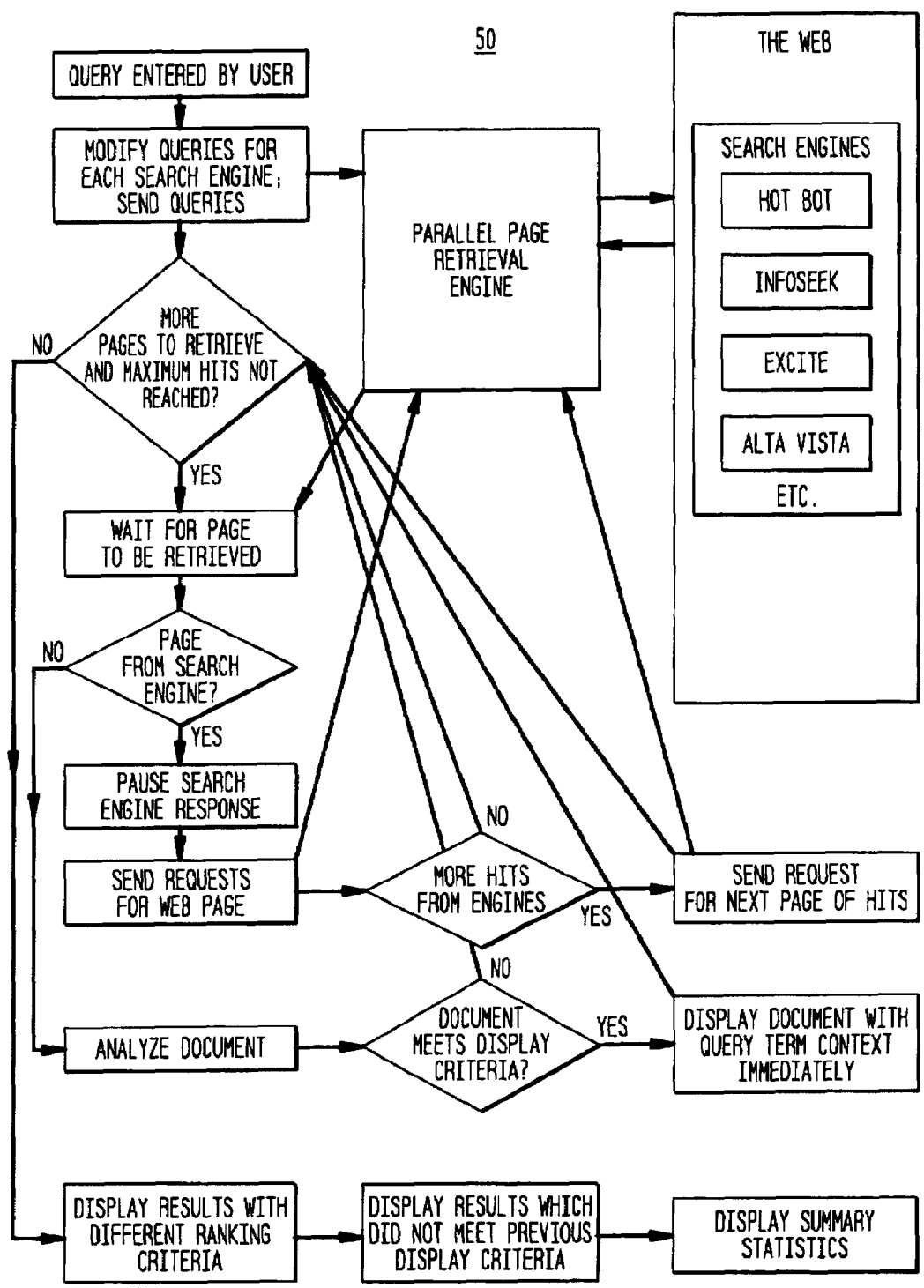
FIG. 10 is a simplified control flow chart of the meta search engine of the present invention.

FIG. 10 shows a simplified control flow diagram 50 of the meta search engine. The page retrieval engine is relatively simple but does incorporate features such as queuing requests and balancing the load from multiple search processes, and delaying requests to the same site to prevent overloading a site. The page retrieval engine comprises a dispatch daemon and a number of client retrieval processes. Pseudocode for (a simplified version of) the dispatch daemon is as follows:

Start clients
Loop
    Check for timeout of active clients
    Send any queued requests if possible, balancing.. ..load for requests from multiple search.. ..processes
    If there is a message from a client
        If message is "replace me" replace the.. ..client with a new process
        If message is "done" update client.. ..information
        If message is "status" return status
        If message is "get" then
            If all clients are busy or a request.. ..has been made to this site.. ..within the last x seconds then.. ..queue the request
            Otherwise send request to a client
        Endif
    Endif
End loop The client processes simply retrieve the relevant pages, handling errors and timeouts, and return the pages directly to the appropriate search process.

Figure 11:
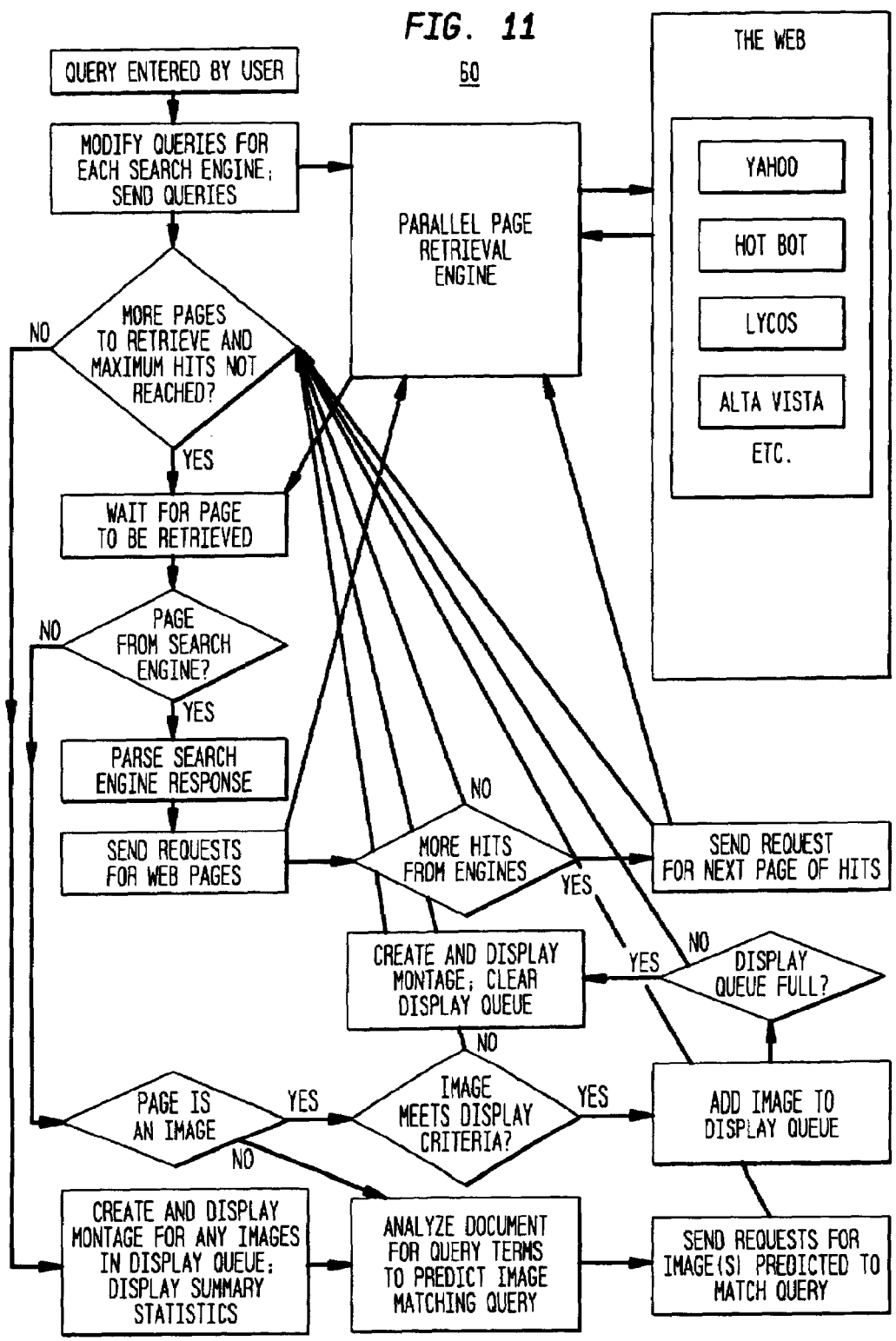
FIG. 11 is a simplified control flow chart for image meta search.

The algorithm used for image meta search in the meta search engine of this invention is as follows:

Process the request to check syntax and create.. ..regular expressions which are used to match.. ..query terms
Send requests (modified appropriately) to all.. ..relevant image search engines
Loop for each page retrieved until maximum number of.. ..images or all pages retrieved
    If page is from a search engine
        Parse search engine response extracting.. ..hits and any link for the next set.. ..of results
        Send requests for all of the hits
        Send request for the next set of results.. ..if applicable
        Else if page is an image
            Add image to the display queue
        Else
            Analyze query term locations in the page.. ..and predict which (if any) of the.. ..images on the page corresponds to.. ..the query—send a request to.. ..download this image
    Endif
    If n images are in the display queue
        Create a single image montage of the.. ..images in the queue
        Display the montage as a clickable image.. ..where each portion of the image.. ..corresponding to the original.. ..individual images shows a detail.. ..page for the original image
    Endif
End loop
If any images are in the display queue
    Create a single image montage of the images in.. ..the queue
    Display the montage as a clickable image where.. ..each portion of the image corresponding.. ..to the original individual images shows.. ..a detail page for the original image
Endif
Print summary statistics FIG. 11 shows a simplified control flow diagram 60 for the image meta search algorithm.

Image Classification

Figure 12:
FIG. 12 shows a first portion of a sample response of the meta search engine of this invention for the query koala in the image databases, filtered for photos.

The Web image search engine WebSeer attempts to classify images as photographs or graphics. WebSeer extracts a number of features from the images and uses decision trees for classification. We have implemented a similar image classification system. However, we use a different feature set and use a neural network for classification. FIGS. 12 and 13 show the response of the meta search engine of this invention to the image query koala, with the images filtered for photos. FIG. 14 shows the response when filtering for graphics.

Document Clustering

Document clustering methods typically produce non-overlapping clusters. For example, Hierarchical Agglomerative Clustering (HAC) algorithms, which are the most commonly used algorithms for document clustering (Willet, P. (1988), "Recent trends in hierarchical document clustering: a critical review", Information Processing and Management 24, 577–597), start with each document in a cluster and iteratively merge clusters until a halting criterion is met. HAC algorithms employ similarity functions (between documents and between sets of documents).

A document clustering algorithm is disclosed herein which is based on the identification of co-occurring phrases and conjunctions of phrases. The algorithm is fundamentally different to commonly used methods in that the clusters may be overlapping, and are intended to identify common items or themes.

The World Wide Web (the Web) is large, contains a lot of redundancy, and a relatively low signal to noise ratio. These factors make finding information on the Web difficult. The clustering algorithm presented here is designed as an aid to information discovery, i.e. out of the many hits returned for a given query, what topics are covered? This allows a user to refine their query in order to investigate one of the subtopics.

The clustering algorithm is as follows:
Retrieve pages corresponding to the query
For each page
   For n=1 to MaximumPhraseLength
     For each set of successive n words
       If this combination of words has not.. ..already appeared in this.. ..document then add the set to a.. ..hash table for this document.. ..and a hash table for all.. ..documents
     End for
   End for
End for
For n=MaximumPhraseLength to 1
   Find the most common phrases of length n, to a.. ..maximum of MaxN phrases, which occurred.. ..more than MinN times
   Add these phrases to the set of clusters
End for
Find the most common combinations of two clusters.. ..from the previous step, to a maximum of MaxC.. ..Combinations, for which the combination.. ..occurred in individual documents at least.. ..MinC times
Delete clusters which are identified by phrases.. ..which are subsets of a phrase identifying.. ..another cluster
Merge clusters which contain identical documents
Display each cluster along with context from a set.. ..of pages for both the query terms.. ..and the cluster terms.

FIG. 15 shows the clusters 70 produced by this algorithm for the query "joydeep ghosh", and FIG. 16 shows the first two cluster summaries 72 and 74 for these clusters. FIGS. 17 and 18 show the clusters 76 and 80 produced by Husky-Search for the same query. FIG. 19 shows the clusters 82 produced by AltaVista. FIGS. 20 and 21 show the clusters 84 and 86 produced by the meta search engine of this invention for another two queries: "neural network" and typing and injury.

Query Expansion

One method of performing query expansion is to augment the query with morphological variants of query terms. Word stemming (Porter, M. F. (1980), "an algorithm for suffix stripping", Program 14, 130–137.) can be used in order to treat morphological variants of a word as identical words. Web search engines typically do not perform word stemming, despite the fact that it would reduce the resources required to index the Web. One reason for the lack of word stemming by Web search engines is that stemming can reduce precision. Stemming considers all morphological variants. Query expansion using all morphological variants often results in reduced precision for Web search because the morphological variants often refer to a different concept. Reduced precision using word stemming is typically more problematic on the Web as compared to traditional information retrieval test collections, because the Web database is larger and more diverse. A query expansion algorithm is disclosed herein which is based on the use of only a subset of morphological variants. Specifically, the algorithm uses the subset of morphological variants which occur on a certain percentage of the Web pages matching the original query. Currently, the query terms are stemmed with the Porter stemmer (Porter, M. F. (1980), "An algorithm for suffix stripping", Program 14, 130–137.) and the retrieved pages can be searched for morphological variants of the query terms. Variants which occur on greater than 1% of the pages are displayed to the user for possible inclusion in a subsequent query. No quantitive evaluation of this technique has been performed, however observation indicates that useful terms are suggested. As an example, for the query nec and "digital watermark", the following terms are suggested for query expansion: digitally, watermarking, watermarks, watermarked.

Currently the technique does not automatically expand a query when first entered, because the query expansion terms are not known until the query is complete. However the technique can be made automatic by maintaining a database of expansion terms for each query term. The first query containing a term can add the co-occurring morphological variants to the database, and subsequent queries can use these terms, and update the database if required.

Specific Expressive Forms

Accurate information retrieval is difficult due to the possibility of information represented in many ways—requiring an optimal retrieval system to incorporate semantics and understand natural language. Research in information retrieval often considers techniques aimed at improving recall, e.g. word stemming and query expansion. As mentioned earlier, it is possible for these techniques to decrease precision, especially in a database as diverse as the Web.

The World Wide Web contains a lot of redundancy. Information is often contained multiple times and expressed in different forms across the Web. In the limit where all information is expressed in all possible ways, high precision information retrieval would be simple and would not require semantic knowledge—one would only need to search for one particular way of expressing the information. While such a goal will never be reached for all information, experiments indicate that the Web is already sufficient for an approach based on this idea to be effective for certain retrieval tasks.

The method of this invention is to transform queries in the form of a question, into specific forms for expressing the answer. For example, the query "What does NASDAQ stand for?" is transformed into the query "NASDAQ stands for" "NASDAQ is an abbreviation" "NASDAQ means". Clearly the information may be contained in a different form to these three possibilities, however if the information does exist in one of these forms, then there is a high likelihood that finding these phrases will provide the answer to the query. The technique thus trades recall for precision. The meta search engine of this invention currently uses the specific expressive forms (SEF) technique for the following queries (square brackets indicate alternatives and parentheses indicate optional terms or alternatives):
   What [is|are]x?
   What [causes|creates|produces] x?
   What do you think [about|of|regarding] x?
   What does x [stand for|mean]?
   Where is x?
   Who is x?
   [Why|how] [is|are](a|the) x y?

Why do x?
When is x?
When do x?
How [do |can] i x?
How (can)[a|the] x y?
How does [a|the] x y?

As an example of the transformations, "What does x [stand for|mean]?" is converted to "x stands for" "x is an abbreviation" "x means", and "What [causes|creates|produces] x?" is transformed to "x is caused" "x is created" "causes x" "produces x" "makes x" "creates x".

Different search engines use different stop words and relevance measures, and this tends to result in some engines returning many pages not containing the SEFs. The offending phrases are therefore filtered out from the queries for the relevant engines.

Figure 23:
FIG. 23 shows the response of Infoseek for the query What does NASDAQ stand for?
Figure 25:
FIG. 25 shows the response of Infoseek for the query How is a rainbow created?
Figure 26:
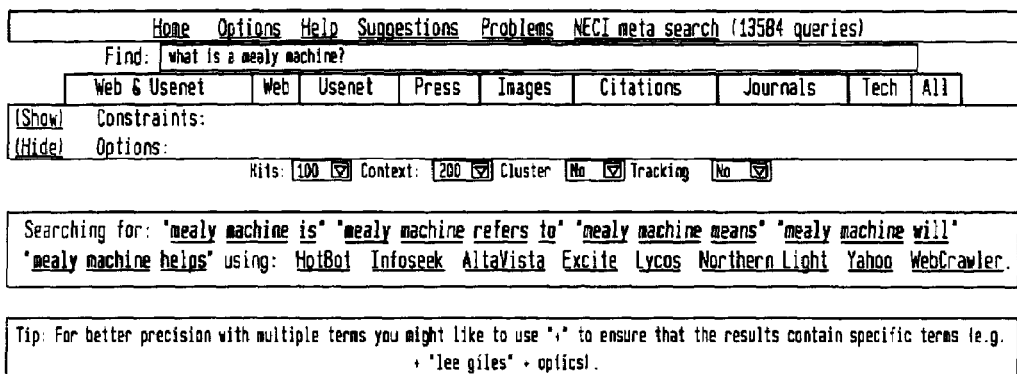
FIG. 26 shows the response of the meta search engine of the present invention for the query What is a mealy machine?

FIG. 22 shows at 90 the response of the meta search engine of this invention for the query "What does NASDAQ stand for?" The answer to the query is contained in the local context displayed for about 5 out of the first 6 pages. FIG. 23 shows at 92 the response of Infoseek to the same query. The answer to the query is not displayed in the page summaries, and which, if any, of the pages contains the answer is not clear. FIGS. 24 and 25 show, at 94 and 96, the meta search engine of this invention and Infoseek responses to the query "How is a rainbow created?" Again, the answer is contained in the local context shown by the meta search engine of this invention but it is not clear which, if any, of the pages listed by Infoseek contain the answer to the question. FIG. 26 shows at 100 a third example of the response from the meta search engine of the invention for the query "What is a mealy machine?"

It is reasonable to expect that the amount of easily accessible information will increase over time, and therefore that the viability of the specific expressive forms technique will improve over time. An extension of the above-discussed procedures is to define an order over the various SEFs, e.g. "x stands for" may be more likely to find the answer to "What does x stand for" than the phrase "x means". If none of the SEFs are found then the engine could fall back to a standard query.

Search tips may be provided by the meta engine. These tips may include, for example, the following:

Use quotes for phrases, e.g. "nec research".
You can hide the various options above to save screen space by clicking on the "hide" links.
Window option: clicking on a hit brings up the page in the same window for multiple searches or a new window for each new search.
Filter option: filters pages when viewed to highlight query terms. Faster due to local caching of the page.
The letter(s) after the page titles identify the search engine which provided the result (e.g. A==AltaVista).
The second field after the page titles is the time since the page was last updated (e.g. 5 m=5 months, 1y=1 year).
The third field after the page titles is the size of the page.
The context option selects the number of characters to display either side of the query terms.
The timeout option is the maximum time to download each individual page.
Searching in "Press" is useful for higher precision with current news topics.
Image option: remove images from the pages when viewed (for faster viewing).
When viewing a filtered page, clicking on a query term jumps to the next occurrence of that term. Clicking on the last occurrence of a term jumps back to the first occurrence.
You can use "-term" to exclude a term.
You can search for links to a specific page, e.g. link:www.neci.nj.nec.com/homepages/giles. Self links are excluded.
When in doubt use lower case.
This meta engine makes more than three times as many documents available as a single search engine. Constraining your search can help, e.g. if you want to know what NASDAQ stands for, searching for "NASDAQ stands for" rather than "NASDAQ" can find your answer faster although the information may also be expressed in alternative ways.
Clicking on the search engine links in the "Searching for:" line will show the search engine response to the current query.
You can search for images by selecting the "images" button, e.g. "red rose".
The bar to the left of the titles is longer when the query terms are closer together in the document.
The query term links in the "Searching for" line lead to the Webster dictionary definitions.
If you select Tracking: Yes, then your query will be tracked and new hits will be displayed on your customized home page similar to the "recent articles about NEC Research".
Select Cluster: Yes to cluster the documents and identify common themes.
You can filter images using a neural network prediction of whether each image is a photo or a graphic using the Images: option.
A listing of pages ranked by term proximity is shown after all of the documents have been retrieved.

Tracking Queries and URLs

Services such as the Informant (The Informant, 1997) track the response of Web search engines to queries, and inform users when new documents are found. The meta search engine of this invention supports this function. Tracking is initiated for a query by selecting the Track option when performing the query. A daemon then repeats the query periodically, storing new documents along with the time they were found. New documents are presented to the user on the home page of the search engine, as shown at 102 in FIG. 27. The engine does not currently inform users if the documents matching queries have changed, although this could be added.

The meta search engine of this invention also supports tracking URLs. Tracking is initiated by clicking the [Track page] link when viewing one of the pages from the search engine results. Alternatively, tracking may be initiated for an arbitrary URL using the options page. A daemon identifies updates to the pages being tracked, and shows a list of modified pages to the user on the home page, as in FIG. 27. The [Page] link displays the page being tracked and inserts a header at the top showing which lines have been added or modified since the last time the user viewed the page (e.g. see FIG. 28).

Estimating the Coverage of Search Engines and the Size of the Web

As the World Wide Web continues to expand, it is becoming an increasingly important resource for scientists. Immediate access to all scientific literature has long been a dream of scientists, and the Web search engines have made a large and growing body of scientific literature and other information resources easily accessible. The major Web search engines are commonly believed to index a large proportion of the Web. Important questions which impact the choice of search methodology include: What fraction of the Web do the search engines index? Which search engine is the most comprehensive? How up to date are the search engine databases?

A number of search engine comparisons are available. Typically, these involve running a set of queries on a number of search engines and reporting the number of results returned by each engine. Results of these comparisons are of limited value because search engines can return documents which do not contain the query terms. This may be due to (a) the information retrieval technology used by the engine, e.g. Excite uses "concept-based clustering" and Infoseek uses morphology—these engines can return documents with related words, (b) documents may no longer exist—an engine which never deletes invalid documents would be at an advantage, and (c) documents may still exist but may have changed and no longer contain the query terms.

Selberg and Etzioni (Selberg, E. and Etzioni, O. (1995), Multi-service search and comparison using the MetaCrawler, in "Proceedings of the 1995 World Wide Web Conference".) have presented results based on the usage logs of the MetaCrawler meta search service (due to substantial changes in the search engine services and the Web, it is expected that their results would be significantly different if repeated now). These results considered the following engines: Lycos, WebCrawler, InfoSeek, Galaxy, Open Text, and Yahoo. Selberg and Etzioni's results are informative but limited for several reasons.

First, they present the "market share" of each engine which is the percentage of documents that users follow that originated from each of the search engines. These results are limited for a number of reasons, including (a) relevance is difficult to determine without viewing the pages, and (b) presentation order affects user relevance judgements (Eisenberg, M. and Barry, C. (1986), Order effects: A preliminary study of the possible influence of presentation order on user judgements of document relevance, in "Proceedings of the 49th Annual Meeting of the American Society for Information Science", Vol. 23, pp. 80–86).

The results considered by Selberg and Etzioni are also limited because they present results on the percentage of unique references returned and the coverage of each engine. Their results suggest that each engine covers only a fraction of the Web, however their results are limited because (a) as above, engines can return documents which do not contain the query terms—engines which return documents with related words or invalid documents can result in significantly different results, and (b) search engines return documents in different orders, meaning that all documents need to be retrieved for a valid comparison, e.g. two search engines may index exactly the same set of documents yet return a different set as the first x.

In addition, Selberg and Etzioni find that the percentage of invalid links was 15%. They do not break this down by search engine. Selberg and Etzioni do point out limitations in their study (which is just a small part of a larger paper on the very successful MetaCrawler service).

AltaVista and Infoseek have recently confirmed that they do not provide comprehensive coverage on the Web (Brake, D. (1997), "Lost in cyberspace", New Scientist 154(2088), 12–13.) Discussed below are estimates on how much they do cover.

We have produced statistics on the coverage of the major Web search engines, the size of the Web, and the recency of the search engine databases. Only the 6 current major full-text search engines are considered herein (in alphabetical order): AltaVista, Excite, HotBot, Infoseek, Lycos, and Northern Light. A common perception is that these engines index roughly the same documents, and that they index a relatively large portion of the Web.

We first compare the number of documents returned when using different combinations of 1 to 6 search engines. Our overall methodology is to retrieve the list of matching documents from all engines and then retrieve all of the documents for analysis. Two important constraints were used.

The first constraint was that the entire list of documents matching the query must have been retrieved for all of the search engines in order for a query to be included in the study. This constraint is important because the order in which the engines rank documents varies between engines. Consider a query which resulted in greater than 1,000 documents from each engine. If we only compared the first 200 documents from each engine we may find many unique URLs. However, we would not be able to determine if the engines were indexing unique URLs, or if they were indexing the same URLs but returning a different subset as the first 200 documents.

The second constraint was that for all of the documents that each engine lists as matching the query, we attempted to download the full text of the corresponding URL. Only documents which could be downloaded and which actually contain the query terms are counted. This is important because (a) some engines can return documents which they believe are relevant but do not contain the query terms (e.g. Excite uses "concept-based clustering" and may consider related words, and Infoseek uses morphology), and (b) each search engine contains a number of invalid links, and the percentage of invalid links varies between the search engines (engines which do not delete invalid links would be at an advantage).

Other details important to the analysis are:

1. Duplicates are removed when considering the total number of documents returned by one engine or by a combination of engines, including detection of identical pages with different URLs. URLs are normalized by a)removing any "index.html" suffix or trailing "/", b) removing a port 80 designation (the default), c) removing the first segment of the domain name for URLs with a directory depth greater than 1(in order to account for machine aliases), and d) unescaping any "escaped" characters. (e.g. %7E in a URL is equivalent to the tilde character).

2. We consider only lowercase queries because different engines treat capitalized queries differently (e.g. AltaVista returns only capitalized results for capitalized queries).

3. We used an individual page timeout of 60 seconds. Pages which timed out were not included in the analysis.

4. We use a fixed maximum of 700 documents per query (from all engines combined after the removal of duplicates) —queries returning more documents were not included. The search engines typically impose a maximum number of documents which can be retrieved (current limits are AltaVista 200, Infoseek 500, HotBot 1,000, Excite 1,000, Lycos 1,000, and Northern Light>10,000) and we checked to ensure that these limits were not exceeded (using this constraint no query returned more than the maximum from each engine, notably no query returned more than 200 documents from AltaVista).

5. We only counted documents which contained the exact query terms, i.e. the word "crystals" in a document would not match a query term of "crystal"—the non-plural form of the word would have to exist in the document in order for the document to be counted as matching the query. This is necessary because different engines use different morphology rules.

6. HotBot and Altavista can identify alternate pages with the same information on the Web. These alternate pages are included in the statistics (as they are for the engines which do not identify alternate pages with the same data).

7. The "special collection" (premier documents not part of the publicly indexable Web) of Northern Light was not used.

Over a period of time, we have collected 500 queries which satisfy the constraints. For the results presented herein, we performed the 500 queries during the period Aug. 23, 1997 to Aug. 24, 1997. We manually checked that all results were retrieved and parsed correctly from each engine before and after the tests because the engines periodically change their formats for listing documents and/or requesting the next page of documents (we also use automatic methods designed to detect temporary failures and changes in the search engine response formats).

Figure 29:
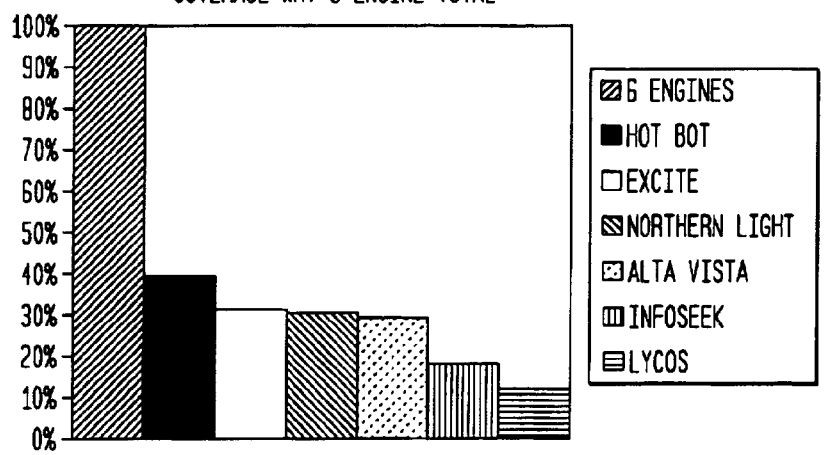
FIG. 29 shows the coverage of each of six search engines with respect to the combined coverage of all six.

FIG. 29 shows the fraction of the total number of documents from the 6 engines which were retrieved by each individual engine. Table 1 below shows these results along with the 95% confidence interval. HotBot is the most comprehensive in this comparison. These results are specific to the particular queries performed and the state of the engine databases at the time they were performed. Also, the results may be partly due to different indexing rather than different databases sizes—different engines may not index identical words for the same documents (for example, the engines typically impose a maximum file size and effectively truncate oversized documents).

TABLE 1

| Search Engine | Hot-Bot | Excite | Northern Light | Alta-Vista | Infoseek | Lycos |
|---|---|---|---|---|---|---|
| Coverage WRT 6 Engines | 39.2% | 31.1% | 30.4% | 29.2% | 17.9% | 12.2% |
| 95% confidence interval | +/−1.4% | +/−1.2% | +/−1.3% | +/−1.2% | +/−1.1% | +/−1.1% |

Figure 30:
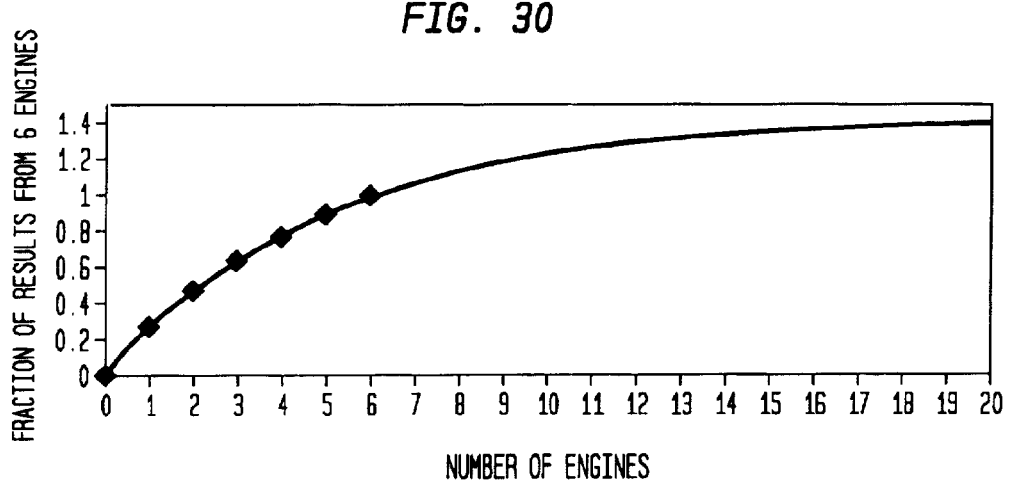
FIG. 30 shows the coverage as the number of search engines is increased.

FIG. 30 shows the average fraction of documents retrieved by 1 to 6 search engines normalized by the number retrieved from all six engines. For 1 to 5 engines, the average is over all combinations of the engines, which is averaged for each query and then averaged over queries. Using the assumption that the coverage increases logarithmically with the number of search engines, and that, in the limit, an infinite number of search engines would cover the entire Web, $f(x)=b(1-1/\exp(ax))$, where a and b are constants and x is the number of search engines, was fit to the data (using Levenberg-Marquardt minimization (Fletcher, R. (1987), Practical Methods of Optimization, Second Edition, John Wiley & Sons) with the default parameters in the program gnuplot) and plotted on FIG. 30. This is equivalent to the assumption that each engine covers a certain fixed percentage of the Web, and each engine's sample of the Web is drawn independently from all Web pages ($c_i=c_{i-1}+c_1(1-c_{i-1})$, i=2 . . . n where $c_1$ is the coverage of i engines and $c_1$ is the coverage of one engine).

There are a number of important biases which should be considered. Search engines typically do not consider indexing documents which are hidden behind search forms, and documents where the engines are excluded by the robots exclusion standard, or by authentication requirements. Therefore, we expect the true size of the Web to be much larger than estimated here. However search engines are unlikely to start indexing these documents, and it is therefore of interest to estimate the size of the Web that they do consider indexing (hereafter referred to as the "indexable Web"), and the relative comprehensiveness of the engines.

The logarithmic extrapolation above is not accurate for determining the size of the indexable Web because (a) the amount of the Web indexed by each engine varies significantly between the engines, and (b) the search engines do not sample the Web independently. All of the 6 search engines offer a registration function for users to register their pages. It is reasonable to assume that many users will register their pages at several of the engines. Therefore the pages indexed by each engine will be partially dependent. A second source of dependence between the sampling performed by each engine comes from the fact that search engines are typically biased towards indexing pages which are linked to in other pages, i.e. more popular pages.

Figure 31:
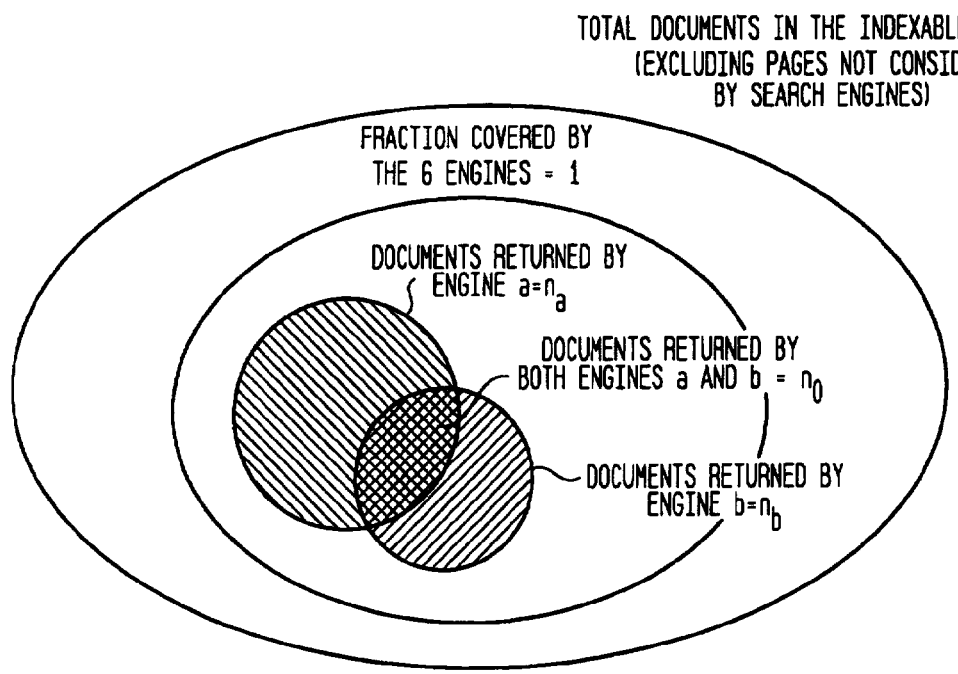
FIG. 31 shows a comparison of the overlap between search engines to the number of documents returned from all six engines combined.

Consider the overlap between engines a and b in FIG. 31. Assuming that each engine samples the Web independently, the quantity $n_o/n_b$ where $n_o$ is the number of documents returned by both engines and $n_b$ is the number of documents returned by engine b, is an estimate of the fraction of the indexable Web, $P_a$, covered by engine a. Using the coverage of 6 engines as a reference point we can write $P'_a=n_a/n_6$, where $n_a$ is the number of documents returned by engine a and $n_6$ is the number of unique documents returned by the combination of 6 engines. Thus, $P'_a$ is the coverage of engine a with respect to the coverage of the 6 engines, we can write $c=P'_a/P_a=n_a n_b/n_6 n_o$. We use this equation to estimate the size of the Web in relation to the amount, of the Web covered by the 6 engines considered here. Because the size of the engines varies significantly, we consider estimating the value of c using combinations of two engines, from the smallest two to the largest two. We limit this analysis to the 245 queries returning ≧50 documents (to avoid difficulty when $n_0=0$). Table 2 shows the results. Values of c smaller than 1 suggest that the size of the indexable Web is smaller than the number of documents retrieved from all 6 engines. It is reasonable to expect that larger engines will have lower dependence because a) they can index more pages other than the pages which users register, and b) they can index more of the less popular pages on the Web. Indeed, there is a clear trend where the estimated value of c increases with the larger engines.

TABLE 2

| Search Engines | Lycos & Infoseek | Infoseek & AltaVista | AltaVista & Northern Light | Northern Light & Excite | Excite & HotBot |
|---|---|---|---|---|---|
| Engine Sizes | Smallest | | → | | Largest |
| Estimated c | 0.6 | 0.9 | 0.9 | 1.9 | 2.2 |
| 95% confidence interval | +/−0.04 | +/−0.06 | +/−0.04 | +/−0.12 | +/−0.17 |

Figure 32:
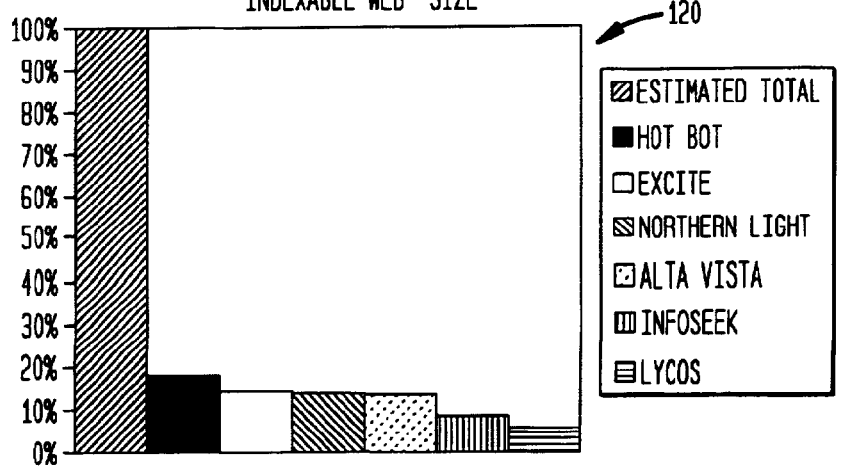
FIG. 32 shows the coverage of each search engine with respect to the estimated size of the indexable Web.

Using c=2.2, from the comparison with the largest two engines, we can estimate the fraction of the indexable Web which the engines cover: HotBot 17.8%, Excite 14.1%, Northern Light 13.8%, AltaVista 13.3%, Infoseek 8.1%, Lycos 5.5%. These results are shown at 120 in FIG. 32. The percentage of the indexable Web indexed by the major search engines is much lower than is commonly believed. We note that (a) it is reasonable to expect that the true value of c is actually larger than 2.2 due to the dependence which remains between the two largest engines, and (b) different results may be found for queries from a different class of users.

HotBot reportedly contains 54 million pages, putting our estimate on a lower bound for the size of the indexable Web at approximately 300 million pages. Currently available estimates of the size of the Web vary significantly. The Internet Archive uses an estimate of 80 million pages (excluding images, sounds, etc.) (Cunningham, M. (1997), 'Brewster's millions', http://www.irish-times.com/irish-times/paper/1997/0127/cmp1.html.) Forrester Research estimates that there are more than 75 million pages (Guglielmo, C. (1997), 'Mr.Kurnit's neighborhood', Upside September.) AltaVista now estimates that there the Web contains 100 to 150 million pages (Brake, D. (1997), 'Lost in cyberspace', *New Scientist* 154(2088), 12–13).

A simple analysis of page retrieval times leads to some interesting conclusions. Table 3 below shows the median time for each of the six major search engines to respond, along with the median time for the first of the six engines to respond when queries are made simultaneously to all engines (as happens in the meta engine).

TABLE 3

| Search Engine | Median Time for response (seconds) |
|---|---|
| AltaVista | 0.9 |
| Infoseek | 1.3 |
| HotBot | 2.6 |
| Excite | 5.2 |
| Lycos | 2.8 |
| Northern Light | 7.5 |
| All engines | 2.7 |
| First of 6 engines | 0.8 |
| First result from the meta search engine of this invention | 1.3 |

Figure 33:
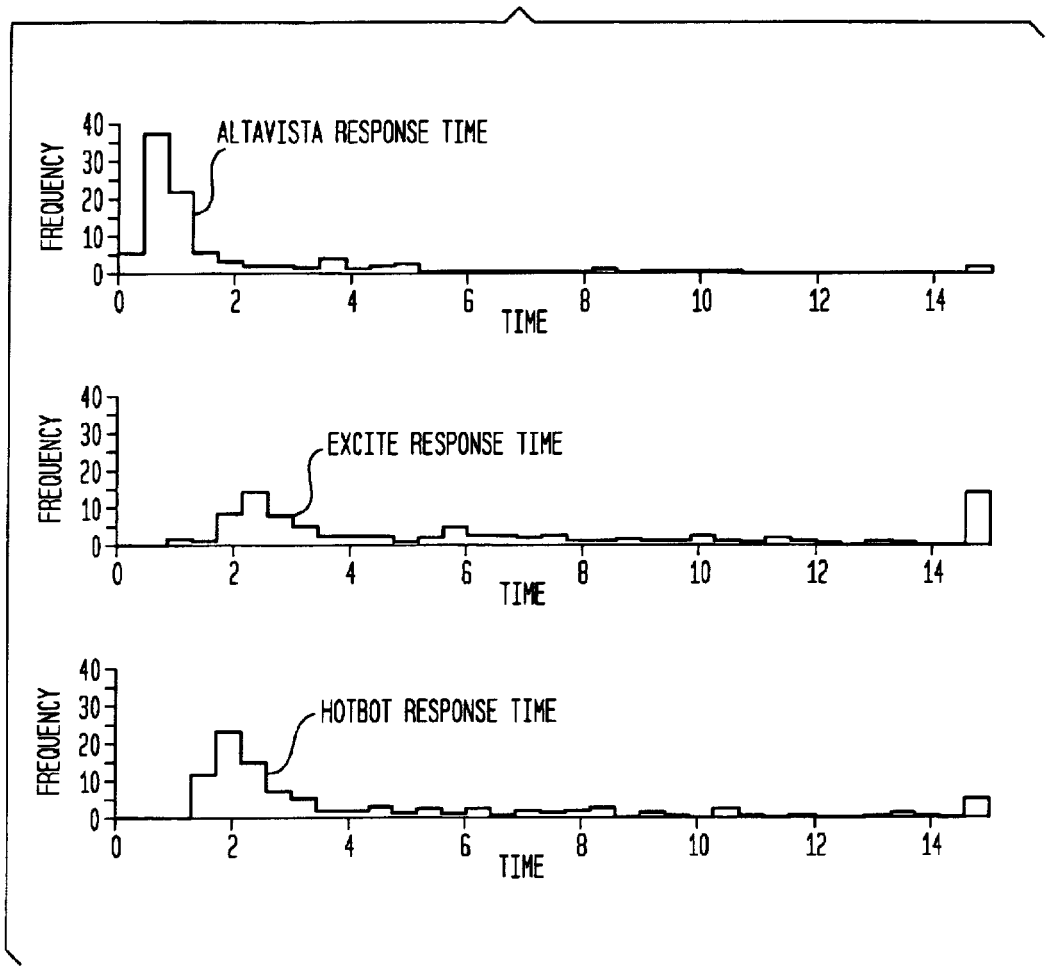
FIGS. 33 and 34 show histograms of the major search engine response times, and a histogram of the response time for the first response when queries are made to the six engines simultaneously.
Figure 34:
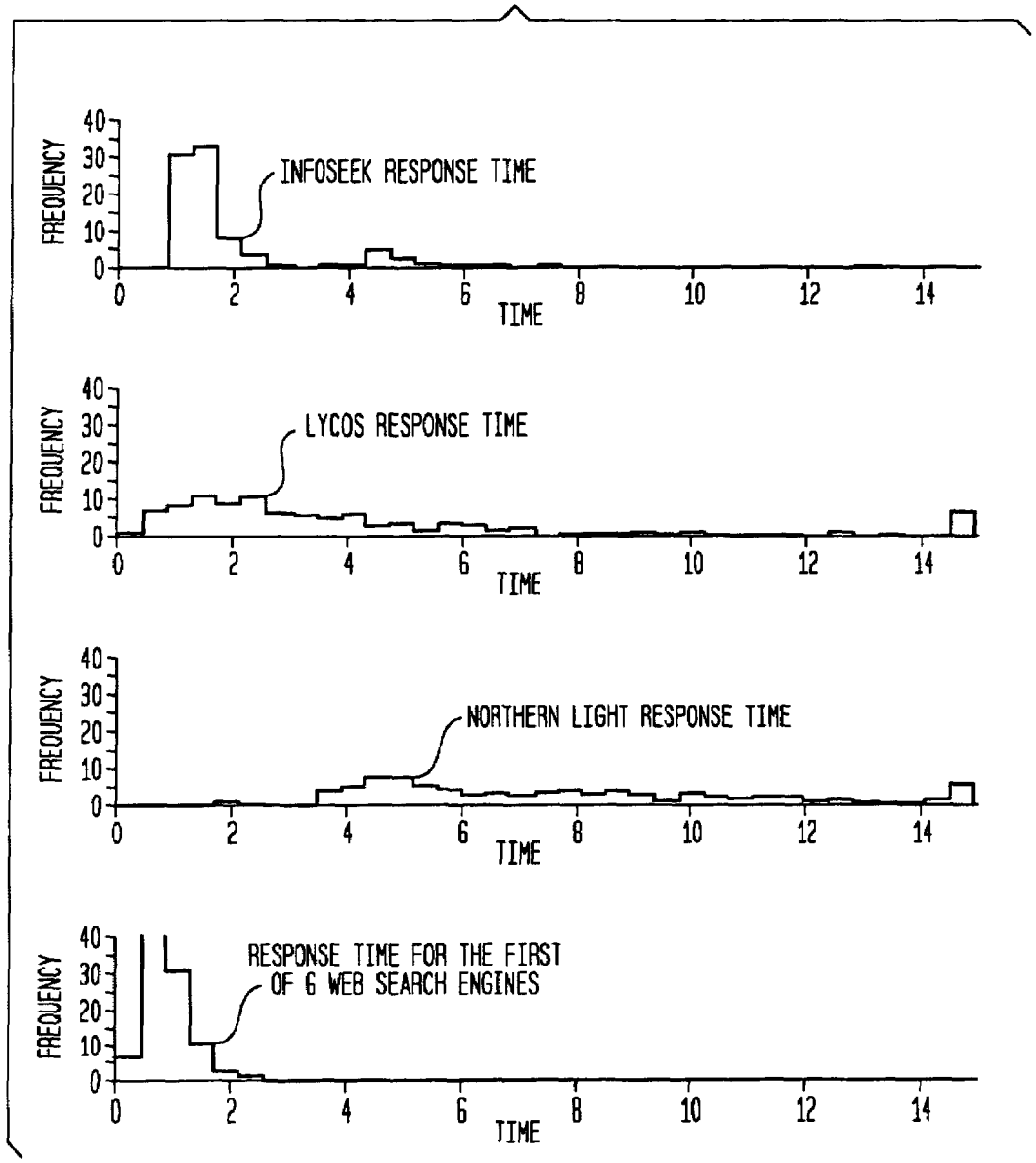
Figure 35:
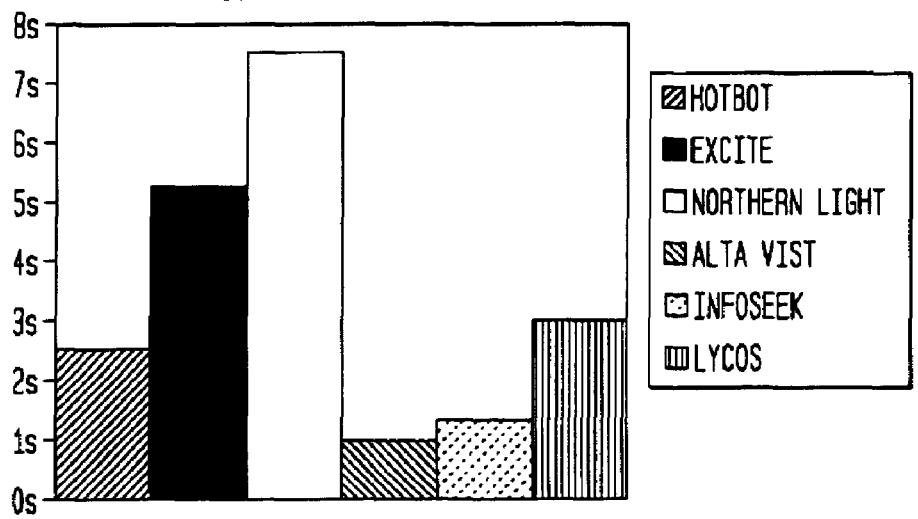
FIG. 35 shows the median time for the Web search engines to respond.
Figure 36:
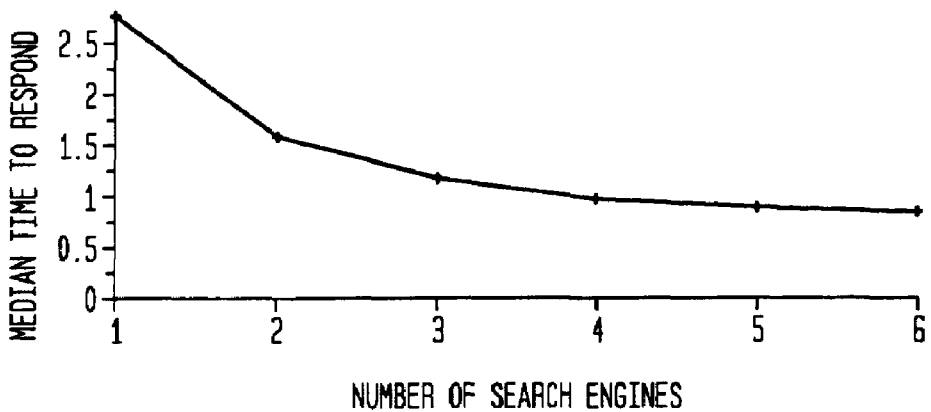
FIG. 36 shows the median time for the first of n Web search engines to respond.

Histograms of the response times for these engines and the first of 6 engines are shown in FIGS. 33 and 34, and the median times are shown in FIG. 35. FIG. 36 shows the median time for the first of n engines to respond. These results are from September 1997, and we note that the relative speed of the search engines varies over time.

Figure 37:
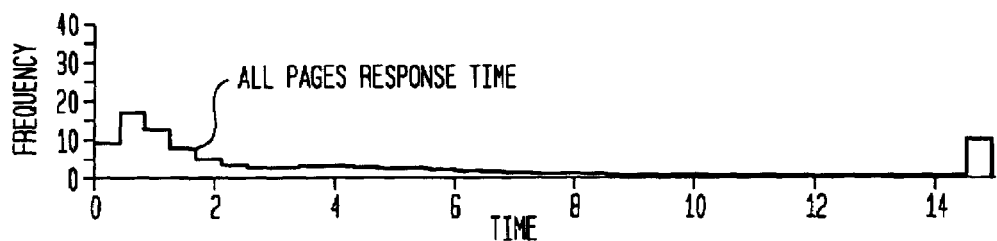
FIG. 37 shows the response time for arbitrary Web pages.
Figure 38:
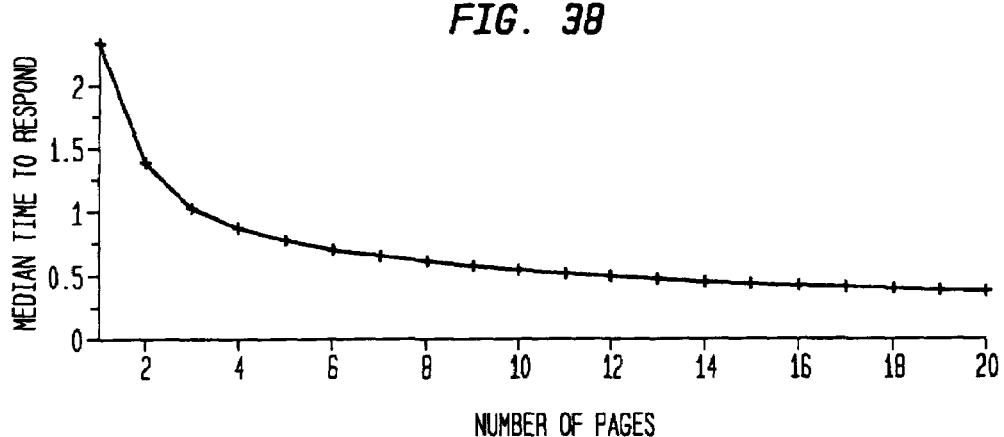
FIG. 38 shows the median time to download the first of n pages requested simultaneously.

Looking now at the time to download arbitrary Web pages, FIG. 37 shows a histogram of the response time. FIG. 38 shows the median time for the first of n engines to respond. We can estimate the time for the meta engine to display the first result, which we create by sampling from the distributions for the first of 6 search engines (the meta engine actually uses more than 6 search engines but we concentrate on the major Web engines here), and the first of 10 Web pages (the actual number depends on the number returned by the first engine to respond), adding these together, and averaging over 10,000 trials.

Figure 39:
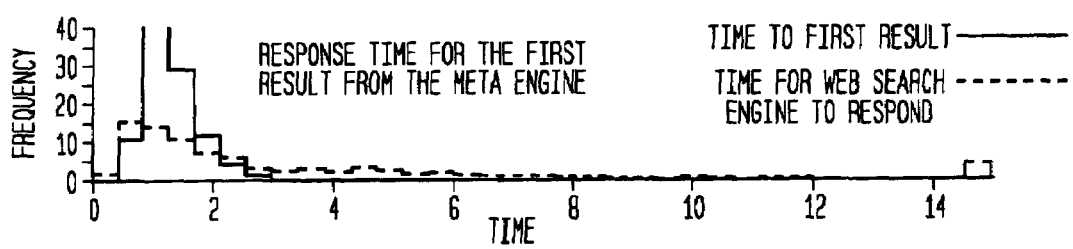
FIG. 39 shows the time for the meta engine to display the first result.

FIG. 39 shows a histogram of this distribution. The median of the distribution is 1.3 seconds (compared to 2.7 seconds for the median response time of a search engine even without downloading any actual pages). For comparison, the average time MetaCrawler takes to return results is 25.7 seconds (without page verification) or 139.3 seconds (with page verification) (Selberg, E. and Etziono, O. (1995), Multi-service search and comparison using the MetaCrawler, in 'Proceedings of the 1995 World Wide Web Conference')(the underlying search engines and/or the Web appear to be significantly faster than they were when Selberg and Etzioni performed their experiment).

Therefore, on average we find that the parallel architecture of the meta engine of this invention allows it to find, download and analyze the first page faster than the standard search engines can produce a result although the standard engines do not download and analyze the pages. Note that the results in this section are specific to the particular queries performed (speed as a function of the query is different for each engine) and the network conditions under which they were performed. These factors may bias the results towards certain engines. The non-stationarity of Web access times is not considered here, e.g. the speed of the engines varies significantly over time (short term variations may be due to network or machine problems and user load, long term variations may be due to modifications in the search engine software, the search engine hardware resources, or relevant network connections).

The meta search engine of this invention demonstrates that real-time analysis of documents returned from Web search engines is feasible. In fact, calling the Web search engines and downloading Web pages in parallel allows the meta search engine of this invention to, on average, display the first result quicker than using a standard search engine.

User feedback indicates that the display of real-time local context around query terms, and the highlighting of query terms in the documents when viewed, significantly improves the efficiency of searching the Web.

Our experiments indicate that an upper bound on the coverage of the major search engines varies from 6% (Lycos) to 18% (HotBot) of the indexable Web. Combining the results of six engines returns more than 3.5 times as many documents when compared to using only one engine. By analyzing the overlap between search engines, we estimate that an approximate lower bound on the size of the indexable Web is 300 million pages. The percentage of invalid links returned by the major engines varies from 3% to 7%. Our results provide an indication of the relative coverage of the major Web search engines, and confirm that, as indicated by Selberg and Etzioni, the coverage of any one search engine is significantly limited.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A computer-implemented meta search engine method, comprising the steps of:
   forwarding a query to a plurality of third party search engines;
   receiving and processing responses from the third party search engines, said responses identifying documents in response to the query, said processing including the steps of,
   (a) downloading the full text of the documents identified in response to the query, and
   (b) locating query terms in the documents and extracting text surrounding the query terms to form at least one context string;
   displaying information regarding the documents, and the at least one context string surrounding one or more of the query terms for each processed document containing the query terms; and clustering the documents based on analysis of the full text of each document and identification of co-occurring phrases and words, and conjunctions thereof and displaying the information regarding the documents arranged by said clusters.

2. A computer-implemented meta search engine method, comprising the steps of:

forwarding a query to a plurality of third party search engines;

receiving and processing responses from the third party search engines, said responses identifying documents in response to the query, said processing including the steps of, (a) downloading the full text of the documents identified in response to the query, and (b) locating query terms in the documents and extracting text surrounding the query terms to form at least one context string;

displaying information regarding the documents, and the at least one context string surrounding one or more of the query terms for each processed document containing the query terms; and displaying suggested additional query terms for expanding the query based on terms in the documents identified in response to the query.

3. A computer-implemented meta search engine method, comprising the steps of:

receiving a query and transforming the query from a form of a question into a form of an answer;

forwarding the transformed query to a plurality of third party search engines;

receiving and processing responses from the third party search engines, said responses identifying documents in response to the query, said processing including the steps of, (a) downloading the full text of the documents identified in response to the query, and (b) locating query terms in the documents and extracting text surrounding the query terms to form at least one context string; and displaying information regarding the documents, and the at least one context string surrounding one or more of the query terms for each processed document containing the query terms.

4. A computer-implemented meta search engine method, comprising the steps of:

forwarding a query to a plurality of third party search engines;

receiving and processing responses from the third party search engines, said responses identifying documents in response to the query, said processing including the steps of, (a) downloading the full text of the documents identified in response to the query, and (b) locating query terms in the documents and extracting text surrounding the query terms to form at least one context string;

displaying information regarding the documents, including the at least one context string surrounding one or more of the query terms for each processed document containing the query terms; and displaying an indication of how close the query terms are to each other in the documents.

\* \* \* \* \*